United States Patent
Mishina et al.

(10) Patent No.: US 12,518,656 B2
(45) Date of Patent: Jan. 6, 2026

(54) SECRET SIGMOID FUNCTION CALCULATION SYSTEM, SECRET LOGISTIC REGRESSION CALCULATION SYSTEM, SECRET SIGMOID FUNCTION CALCULATION APPARATUS, SECRET LOGISTIC REGRESSION CALCULATION APPARATUS, SECRET SIGMOID FUNCTION CALCULATION METHOD, SECRET LOGISTIC REGRESSION CALCULATION METHOD AND PROGRAM

(71) Applicant: NTT, Inc., Tokyo (JP)

(72) Inventors: Ibuki Mishina, Musashino (JP); Dai Ikarashi, Musashino (JP); Koki Hamada, Musashino (JP); Ryo Kikuchi, Musashino (JP)

(73) Assignee: NTT, Inc., Tokyo (JP)

( * ) Notice: Subject to any disclaimer, the term of this patent is extended or adjusted under 35 U.S.C. 154(b) by 816 days.

(21) Appl. No.: 17/279,595

(22) PCT Filed: Oct. 2, 2019

(86) PCT No.: PCT/JP2019/038966
§ 371 (c)(1),
(2) Date: Mar. 25, 2021

(87) PCT Pub. No.: WO2020/071441
PCT Pub. Date: Apr. 9, 2020

(65) Prior Publication Data
US 2021/0358332 A1    Nov. 18, 2021

(30) Foreign Application Priority Data

Oct. 4, 2018 (JP) .................................. 2018-189297
Jan. 11, 2019 (JP) .................................. 2019-003285

(51) Int. Cl.
*G09C 1/00* (2006.01)
*H04L 9/00* (2022.01)

(52) U.S. Cl.
CPC ................ *G09C 1/00* (2013.01); *H04L 9/008* (2013.01)

(58) Field of Classification Search
CPC .......... G09C 1/00; H04L 9/008; H04L 9/085; H04L 2209/46; G06F 7/544
See application file for complete search history.

(56) References Cited

U.S. PATENT DOCUMENTS 10,600,006 B1 * 3/2020 Wang ...................... H04L 9/085
2019/0378210 A1 * 12/2019 Merrill .................... G06N 5/01

OTHER PUBLICATIONS

Miran Kim, et al., "Secure Logistic Regression Based on Homomorphic Encryption: Design and Evaluation", JMIR Medical Informatics, vol. 6, Issue 2, e19, pp. 1-12, 2018, http://medinform.jmir.org/2018/2/e19/.

(Continued)

*Primary Examiner* — Shewaye Gelagay
*Assistant Examiner* — Carlton Johnson
(74) *Attorney, Agent, or Firm* — XSENSUS LLP

(57) ABSTRACT

A secure sigmoid function calculation system is a system in which $\text{map}_\sigma$ is assumed to be secure batch mapping defined by parameters $(a_0, \ldots, a_{k-1})$ representing the domain of definition of a sigmoid function $\sigma(x)$ and parameters $(\sigma(a_0), \ldots, \sigma(a_{k-1}))$ representing the range of the sigmoid function $\sigma(x)$ ($a_0, \ldots, a_{k-1}$ are real numbers that satisfy $a_0 < \ldots < a_{k-1}$) and which is configured with three or more secure sigmoid function calculation apparatuses and calculates, from a share $[[\vec{x}]]$ of an input vector $\vec{x}$, a share $[[\vec{y}]]$ of a value $\vec{y}$ of a sigmoid function for the input vector $\vec{x}$, the system including a secure batch mapping calculating means that calculates the share $[[\vec{y}]]$ by $[[\vec{y}]]$ (Continued)

$=\text{map}_\sigma([[\vec{x}]])=([[\sigma(a_{f(0)})]], \ldots, [[\sigma(a_{f(m-1)})]])$ (where f(i) (0≤i≤m−1) is j that makes $a_j \leq x_i < a_{j+1}$ hold).

6 Claims, 5 Drawing Sheets

(56) References Cited

OTHER PUBLICATIONS

Han et al., "Efficient Logistic Regression on Large Encrypted Data", Available Online At: https://eprint.iacr.org/2018/662.pdf, 2018, 31 pages.

Wu et al., "Privacy-Preservation for Stochastic Gradient Descent Application to Secure Logistic Regression", The 27th Annual Conference of the Japanese Society for Artificial Intelligence, Available Online At: https://www.jstage.jst.go.jp/article/pjsai/JSAI2013/0/JSAI2013_3L1OS06a3/_pdf/-char/ja, 2013, pp. 1-4.

Aono et al., "Scalable and Secure Logistic Regression via Homomorphic Encryption", In Symposium on Cryptography and Information Security, Jan. 19-22, 2016, 16 Pages including English Translation.

* cited by examiner

| SECURE LOGISTIC REGRESSION CALCULATION ALGORITHM |
|---|
| INPUT: $[[\vec{x_i}]], [[y_i]] (0 \leq i \leq m-1)$ <br> PARAMETERS: $\eta, T$ <br> OUTPUT: $[[\vec{w}]]$ <br> 1: SET INITIAL VALUE $[[\vec{w_0}]]$ OF $[[\vec{w}]]$ <br> 2:   $a \leftarrow 1/m$ <br> 3:   $t \leftarrow 0$ <br> 4:   while $t<T$ do <br> 5:     $i \leftarrow 0$ <br> 6:     while $i<m$ do <br> 7:       $[[b_i]] \leftarrow \text{hpsum}([[\vec{w_i}]], [[(1, \vec{x_i})]])$ <br> 8:       $i \leftarrow i+1$ <br> 9:     end while <br> 10:    $([[c_0]], \ldots, [[c_{m-1}]]) \leftarrow \text{Sigmoid}(([[b_0]], \ldots, [[b_{m-1}]]))$ <br> 11:    $i \leftarrow 0$ <br> 12:    while $i<m$ do <br> 13:      $[[d_i]] \leftarrow [[c_i]] - [[y_i]]$ <br> 14:      $i \leftarrow i+1$ <br> 15:    end while <br> 16:    $j \leftarrow 0$ <br> 17:    while $j<n+1$ do <br> 18:      $[[e]] \leftarrow \sum_{i=0}^{m-1} [[d_i]][[x_{i,j}]]$ <br> 19:      $[[w_{j,t+1}]] \leftarrow [[w_{j,t}]] - \eta a [[e]]$ <br> 20:      $j \leftarrow j+1$ <br> 21:    end while <br> 22:    $t \leftarrow t+1$ <br> 23: end while |

FIG. 2

SECRET SIGMOID FUNCTION CALCULATION SYSTEM, SECRET LOGISTIC REGRESSION CALCULATION SYSTEM, SECRET SIGMOID FUNCTION CALCULATION APPARATUS, SECRET LOGISTIC REGRESSION CALCULATION APPARATUS, SECRET SIGMOID FUNCTION CALCULATION METHOD, SECRET LOGISTIC REGRESSION CALCULATION METHOD AND PROGRAM

CROSS-REFERENCE TO RELATED APPLICATIONS

The present application is based on PCT filing PCT/JP2019/038966, filed Oct. 2, 2019, which claims priority to JP 2018-189297, filed Oct. 4, 2018, and JP 2019-003285, filed Jan. 11, 2019, the entire contents of each are incorporated herein by reference.

TECHNICAL FIELD

The present invention relates to secure computation techniques. In particular, the present invention relates to a technique for performing secure computation of a sigmoid function or a technique for performing secure computation of a model parameter of a logistic regression model.

BACKGROUND ART

As an existing method for performing secure computation of a sigmoid function, there are a method for performing approximation using a cubic polynomial by fully homomorphic encryption-based secure computation (Non-patent Literature 1) and a method for performing approximation using a polynomial by additively homomorphic encryption-based secure computation (Non-patent Literature 2 and Non-patent Literature 3).

Secure computation is a method for obtaining the computation result of a designated computation without reconstructing the encrypted numerical values (see, for example, Reference Non-patent Literature 1). With the method of Reference Non-patent Literature 1, it is possible to perform encryption by which a plurality of pieces of information, whose numerical values can be reconstructed, are distributed over three secure computation apparatuses and make the three secure computation apparatuses hold the results of addition and subtraction, constant addition, multiplication, constant multiplication, logical operations (a NOT, an AND, an OR, and an XOR), and data format conversion (an integer or a binary) with the results being distributed over these secure computation apparatuses, that is, in an encrypted state, without reconstructing the numerical values. In general, the number of secure computation apparatuses over which the information is distributed is not limited to 3 and can be set at W (W is a predetermined constant greater than or equal to 3), and a protocol that implements secure computation by cooperative computations by W secure computation apparatuses is called a multi-party protocol.

(Reference Non-patent Literature 1: Koji Chida, Koki Hamada, Dai Ikarashi, and Katsumi Takahashi, "A Three-party Secure Function Evaluation with Lightweight Verifiability Revisited", In CSS, 2010.)

PRIOR ART LITERATURE

Non-Patent Literature

Non-patent Literature 1: Kyoohyung Han, Seungwan Hong, Jung Hee Cheon, and Daejun Park, "Efficient logistic regression on large encrypted data", https://eprint.iacr.org/2018/662.pdf, 2018.
Non-patent Literature 2: Shuang Wu, Tadanori Teruya, Junpei Kawamoto, Jun Sakuma, and Hiroaki Kikuchi, "Privacy-preservation for stochastic gradient descent", the collection of papers of the 27th Annual Conference of the Japanese Society for Artificial Intelligence, 2013, https://www.jstage.jst.go.jp/article/pjsai/JSAI2013/0/JSAI2013_3L1OS06a3/_pdf/-char/ja, the Japanese Society for Artificial Intelligence, 2013.
Non-patent Literature 3: Yoshinori Aono, Takuya Hayashi, Le Trieu Phong, and Lihua Wang, "Proposal for Large-Scale and Privacy-Preserving Logistic Analysis Technique", In SCIS2016, 2016.

SUMMARY OF THE INVENTION

Problems to be Solved by the Invention

However, a sigmoid function is a nonlinear function which is expressed by the following formula (see FIG. 1) and it is not easy to perform secure computation of the sigmoid function while achieving precision and processing speed at the same time.

$$\sigma(x)=1/(1+\exp(-x)) \qquad (1)$$

The accuracy of approximation of all of the methods described in Non-patent Literatures 1 to 3 is low and these methods require an approximate formula to be rewritten each time in accordance with the domain of definition of x, which makes these methods impractical. Moreover, the higher the order of an approximate polynomial is made, the higher the accuracy of approximation thereof becomes; however, this increases the number of multiplications accordingly and thereby slows down processing.

Therefore, an object of the present invention is to provide a technique for performing secure computation of a sigmoid function with high speed and precision. Moreover, an object of the present invention is to provide a technique for performing secure computation of a model parameter of a logistic regression model with high speed and precision using a technique for performing secure computation of a sigmoid function.

Means to Solve the Problems

A secure sigmoid function calculation system according to an aspect of the present invention is a secure sigmoid function calculation system in which $\text{map}_\sigma$ is assumed to be secure batch mapping defined by parameters $(a_0, \ldots, a_{k-1})$ representing the domain of definition of a sigmoid function $\sigma(x)$ and parameters $(\sigma(a_0), \ldots, \sigma(a_{k-1}))$ representing the range of the sigmoid function $\sigma(x)$ (where k is an integer greater than or equal to 1 and $a_0, \ldots, a_{k-1}$ are real numbers that satisfy $a_0 < \ldots < a_{k-1}$), and which is configured with three or more secure sigmoid function calculation apparatuses and calculates, from a share $[[\vec{x}]]=([[x_0]], \ldots, [[x_{m-1}]])$ of an input vector $\vec{x}=(x_0, \ldots, x_{m-1})$, a share $[[\vec{y}]]=$ $([[y_0]], \ldots, [[y_{m-1}]])$ of a value $\vec{y} = (y_0, \ldots, y_{m-1})$ of a sigmoid function for the input vector $\vec{x}$. The secure sigmoid function calculation system includes a secure batch mapping calculating means that calculates $map_\sigma([[\vec{x}]]) = ([[\sigma(a_{f(0)})]], \ldots, [[\sigma(a_{f(m-1)})]])$ (where f(i) ($0 \le i \le m-1$) is j that makes $a_j \le x_i < a_{j+1}$ hold) from the share $[[\vec{x}]]$ and calculates the share $[[\vec{y}]]$ by $([[y_0]], \ldots, [[y_{m-1}]]) = ([[\sigma(a_{f(0)})]], \ldots, [[\sigma(a_{f(m-1)})]])$.

A secure logistic regression calculation system according to an aspect of the present invention is a secure logistic regression calculation system in which m is assumed to be an integer greater than or equal to 1, $\eta$ is assumed to be a real number that satisfies $0 < \eta < 1$, and Sigmoid $([[x]])$ is assumed to be a function that calculates, from a share $[[\vec{x}]]$ of an input vector $\vec{x}$, a share $[[\vec{y}]]$ of a value $\vec{y}$ of a sigmoid function for the input vector $\vec{x}$ using the secure sigmoid function calculation system, and which is configured with three or more secure logistic regression calculation apparatuses and calculates a share $[[\vec{w}]]$ of a model parameter $\vec{w}$ of a logistic regression model from a share $[[\vec{x_i}]]$ ($0 \le i \le m-1$) of data $\vec{x_i}$ on an explanatory variable and a share $[[y_i]]$ ($0 \le i \le m-1$) of data $y_i$ on a response variable. The secure logistic regression calculation system includes: an initializing means that sets a share $[[\vec{w_0}]]$ of an initial value $\vec{w_0}$ of the model parameter $\vec{w}$; an error calculating means that calculates, for i=0, ..., m-1, $[[b_i]]$ by $[[b_i]]$=hpsum $([[\vec{w_t}]], [[(1, \vec{x_i})]])$ from a share $[[\vec{w_t}]]$ of a value $\vec{w_t}$ of the model parameter $\vec{w}$ obtained as a result of t updates and the share $[[\vec{x_i}]]$, calculates $([[c_0]], \ldots, [[c_{m-1}]])$ by $([[c_0]], \ldots, [[c_{m-1}]])$=Sigmoid $(([[b_0]], \ldots, [[b_{m-1}]]))$ from the $[[b_i]]$ ($0 \le i \le m-1$), and calculates, for i=0, ..., m-1, an error $[[d_i]]$ by $[[d_i]]=[[c_i]]-[[y_i]]$ from the share $[[y_i]]$ and an i-th element $[[c_i]]$ of the $([[c_0]], \ldots, [[c_{m-1}]])$; and a model parameter updating means that calculates, for j=0, ..., n, $[[e]]$ by $[[e]]=\Sigma_{i=0}^{m-1}[[d_i]][[x_{i,j}]]$ from the error $[[d_i]]$ ($0 \le i \le m-1$) and a j-th element $[[x_{i,j}]]$ ($0 \le i \le m-1$) of the share $[[\vec{x_i}]]$ and calculates, from a j-th element $[[w_{j,t}]]$ of the share $[[\vec{w_t}]]$ and the $[[e]]$ by $[[w_{j,t+1}]]=[[w_{j,t}]]-\eta(1/m)[[e]]$, a j-th element $[[w_{j,t+1}]]$ of a share $[[\vec{w_{t+1}}]]$ of a value $\vec{w_{t+1}}$ of the model parameter $\vec{w}$ obtained as a result of t+1 updates.

A secure logistic regression calculation system according to an aspect of the present invention is a secure logistic regression calculation system in which m is assumed to be an integer greater than or equal to 1, $\eta$ is assumed to be a real number that satisfies $0 < \eta < 1$, and Sigmoid $([[x]])$ is assumed to be a function that calculates, from a share $[[\vec{x}]]$ of an input vector $\vec{x}$, a share $[[\vec{y}]]$ of a value $\vec{y}$ of a sigmoid function for the input vector $\vec{x}$ using the secure sigmoid function calculation system, and which is configured with three or more secure logistic regression calculation apparatuses and calculates a share $[[\vec{w}]]$ of a model parameter $\vec{w}$ of a logistic regression model from a share $[[\vec{x_i}]]$ ($0 \le i \le m-1$) of data $\vec{x_i}$ on an explanatory variable and a share $[[y_i]]$ ($0 \le i \le m-1$) of data $y_i$ on a response variable. The secure logistic regression calculation system includes: an initializing means that sets a share $[[\vec{w_0}]]$ of an initial value $\vec{w_0}$ of the model parameter $\vec{w}$; an error calculating means that calculates, for i=0, ..., m-1, $[[b_i]]$ by $[[b_i]]$=hpsum $([[\vec{w_t}]], [[(1, \vec{x_i})]])$ from a share $[[\vec{w_t}]]$ of a value $\vec{w_t}$ of the model parameter $\vec{w}$ obtained as a result of t updates and the share $[[\vec{x_i}]]$, calculates $([[c_0]], \ldots, [[c_{m-1}]])$ by $([[c_0]], \ldots, [[c_{m-1}]])$=Sigmoid $(([[b_0]], \ldots, [[b_{m-1}]]))$ from the $[[b_i]]$ ($0 \le i \le m-1$), and calculates, for i=0, ..., m-1, an error $[[d_i]]$ by $[[d_i]]=[[c_i]]-[[y_i]]$ from the share $[[y_i]]$ and an i-th element $[[c_i]]$ of the $([[c_0]], \ldots, [[c_{m-1}]])$; and a model parameter updating means that calculates, for j=0, ..., n, $[[e]]$ by $[[e]]=\Sigma_{i=0}^{m-1}[[d_i]][[x_{i,j}]]$ from the error $[[d_i]]$ ($0 \le i \le m-1$) and a j-th element $[[x_{i,j}]]$ ($0 \le i \le m-1$) of the share $[[\vec{x_i}]]$ and calculates, from a j-th element $[[w_{j,t}]]$ of the share $[[\vec{w_t}]]$ and the $[[e]]$ by $[[w_{j,t+1}]]=[[w_{j,t}]]-\eta(1/m)[[e]]$, a j-th element $[[w_{j,t+1}]]$ of a share $[[\vec{w_{t+1}}]]$ of a value $\vec{w_{t+1}}$ of the model parameter $\vec{w}$ obtained as a result of t+1 updates.

A secure logistic regression calculation system according to an aspect of the present invention is a secure logistic regression calculation system in which m is assumed to be an integer greater than or equal to 1, $\eta$ is assumed to be a real number that satisfies $0 < \eta < 1$, and Sigmoid $([[x]])$ is assumed to be a function that calculates, from a share $[[\vec{x}]]$ of an input vector $\vec{x}$, a share $[[\vec{y}]]$ of a value $\vec{y}$ of a sigmoid function for the input vector $\vec{x}$ using the secure sigmoid function calculation system; when an arbitrary value, which is an object on which secure computation is to be performed, is assumed to be p and the precision of p is written as b_p [bit], it means that a share $[[p]]$ of p is actually a share $[[p \times 2^{b\_p}]]$ of a fixed-point number; when an arbitrary vector, which is an object on which secure computation is to be performed, is assumed to be $\vec{q}$, an element of $\vec{q}$ is assumed to be $q_i$, and the precision of $\vec{q}$ is written as b_q [bit], it means that a share $[[\vec{q}]]$ of $\vec{q}$ is actually made up of a share $[[q_i \times 2^{b\_q}]]$ of a fixed-point number; the precision of $\vec{w}$, $\vec{w_0}$, $\vec{w_t}$, $\vec{w_{t+1}}$, and eta_grad_ave is written as b_w [bit], the precision of $\vec{x_i}$ ($0 \le i \le m-1$) is written as b_x [bit], the precision of $y_i$ ($0 \le i \le m-1$), $c_i$ ($0 \le i \le m-1$), and $d_i$ ($0 \le i \le m-1$) is written as b_y [bit], the precision of $\eta$ is written as b_$\eta$ [bit], the precision of $b_i$ ($0 \le i \le m-1$) is written as b_w+b_x [bit], and the precision of e is written as b_y+b_x [bit]; b_w, b_x, b_y, and b_$\eta$ are assumed to be predetermined positive integers; rshift(a, b) is assumed to mean shifting a value a to the right by b [bit] by performing an arithmetic right shift; and floor is assumed to be a function representing rounding down and X=-(floor (log$_2$ ($\eta$/m))). The secure logistic regression calculation system is configured with three or more secure logistic regression calculation apparatuses and calculates a share $[[\vec{w}]]$ of a model parameter $\vec{w}$ of a logistic regression model from a share $[[\vec{x_i}]]$ ($0 \le i \le m-1$) of data $\vec{x_i}$ on an explanatory variable and a share $[[y_i]]$ ($0 \le i \le m-1$) of data $y_i$ on a response variable. The secure logistic regression calculation system includes: an initializing means that sets a share $[[\vec{w_0}]]$ of an initial value $\vec{w_0}$ of the model parameter $\vec{w}$; an error calculating means that calculates, for i=0, ..., m-1, $[[b_i]]$ by $[[b_i]]$=hpsum $([[\vec{w_t}]], [[(1, \vec{x_i})]])$ from a share $[[\vec{w_t}]]$ of a value $\vec{w_t}$ of the model parameter $\vec{w}$ obtained as a result of t updates and the share $[[\vec{x_i}]]$, calculates $([[c_0]], \ldots, [[c_{m-1}]])$ by $([[c_0]], \ldots, [[c_{m-1}]])$=Sigmoid $(([[b_0]], \ldots, [[b_{m-1}]]))$ from the $[[b_i]]$ ($0 \le i \le m-1$), and calculates, for i=0, ..., m-1, an error $[[d_i]]$ by $[[d_i]]=[[c_i]]-[[y_i]]$ from the share $[[y_i]]$ and an i-th element of the $([[c_0]], \ldots, [[c_{m-1}]])$; and a model parameter updating means that calculates, for j=0, ..., n, $[[e]]$ by $[[e]]=\Sigma_{i=0}^{m-1}$ from the error $[[d_i]]$ ($0 \le i \le m-1$) and a j-th element $[[x_{i,j}]]$ ($0 \le i \le m-1$) of the share $[[\vec{x_i}]]$, calculates $[[eta\_grad\_ave]]$ by $[[eta\_grad\_ave]]$=rshift$([[e]]$, X+b_y+b_x-b_w) from the $[[e]]$, and calculates, from a j-th element $[[w_{j,t}]]$ of the share $[[\vec{w_t}]]$ and the $[[eta\_grad\_ave]]$ by $[[w_{j,t+1}]]=[[w_{j,t}]]-[[eta\_grad\_ave]]$, a j-th element $[[w_{j,t+1}]]$ of a share $[[\vec{w_{t+1}}]]$ of a value $\vec{w_{t+1}}$ of the model parameter $\vec{w}$ obtained as a result of t+1 updates.

Effects of the Invention

According to the present invention, it is possible to perform secure computation of a sigmoid function with high speed and precision. Moreover, according to the present invention, it is possible to perform secure computation of a model parameter of a logistic regression model with high speed and precision.

BRIEF DESCRIPTION OF THE DRAWINGS

FIG. 2 is a diagram showing a secure logistic regression calculation algorithm.

DETAILED DESCRIPTION OF THE EMBODIMENTS

Figure 1:
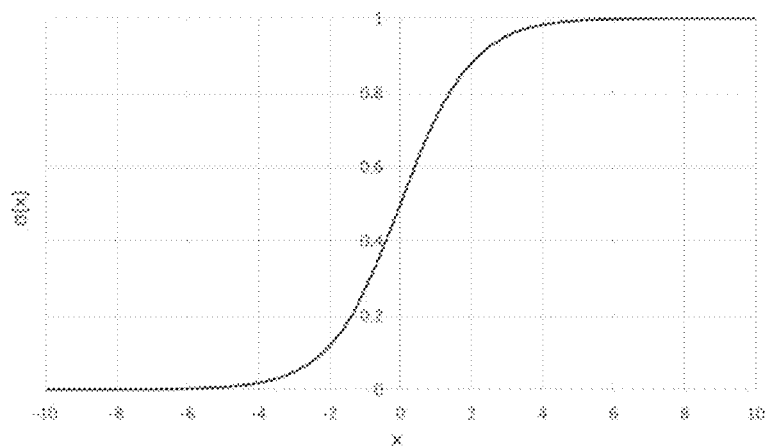
FIG. 1 is a graph showing a sigmoid function $\sigma(x)$.

Hereinafter, embodiments of the present invention will be described in detail. It is to be noted that constituent units having the same function are denoted by the same reference character and overlapping explanations are omitted.

A secure sigmoid function calculation algorithm and a secure logistic regression calculation algorithm, which will be described later, are constructed of a combination of computations on the existing secure computation. Computations required by these algorithms include concealment, addition, multiplication, and hpsum. Here, hpsum is the sum of products. Hereinafter, each computation will be described.

<Computations>
[Concealment]

Assume that [[x]] is a value (hereinafter referred to as a share of x) obtained by concealing x by secure sharing. Any method can be used as a secure sharing method. For example, Shamir's secure sharing over $GF(2^{61}-1)$ or replicated secure sharing over $Z_2$ can be used.

A plurality of secure sharing methods may be combined and used in a certain algorithm. In this case, it is assumed that the secure sharing methods are mutually converted as appropriate.

Moreover, assume that $[[\vec{x}]]=([[x_0]], \ldots, [[x_{n-1}]])$ for an n-dimensional vector $\vec{x}=(x_0, \ldots, x_{n-1})$. n is the number of model parameters and is a predetermined positive integer.

It is to be noted that x is referred to as plaintext of [[x]].

As a method for obtaining [[x]] from x (concealment) and a method for obtaining x from [[x]] (reconstruction), specifically, there are methods described in Reference Non-patent Literature 1 and Reference Non-patent Literature 2.
(Reference Non-patent Literature 2: Shamir, A., "How to share a secure", Communications of the ACM, Vol. 22, No. 11, pp. 612-613, 1979.)
[Addition and Multiplication]

Addition [[x]]+[[y]] by secure computation uses [[x]] and [[y]] as input and outputs [[x+y]]. Multiplication [[x]]×[[y]] (mul([[x]], [[y]])) by secure computation uses [[x]] and [[y]] as input and outputs [[x×y]].

Here, either one of [[x]] and [[y]] may be a value that is not concealed (hereinafter referred to as a public value). For example, a configuration can be adopted in which, on the assumption that β and γ are public values, [[x]] and β are used as input and [[x+β]] is output or γ and [[y]] are used as input and [[γ×y]] is output.

As specific methods of addition and multiplication, there are methods described in Reference Non-patent Literature 3 and Reference Non-patent Literature 4.
(Reference Non-patent Literature 3: Ben-Or, M., Goldwasser, S. and Wigderson, A., "Completeness theorems for non-cryptographic fault-tolerant distributed computation", Proceedings of the twentieth annual ACM symposium on Theory of computing, ACM, pp. 1-10, 1988.)
(Reference Non-patent Literature 4: Gennaro, R., Rabin, M. O. and Rabin, T., "Simplified VSS and fast-track multiparty computations with applications to threshold cryptography", Proceedings of the seventeenth annual ACM symposium on Principles of distributed computing, ACM, pp. 101-111, 1998.)
[hpsum]

Secure computation hpsum([[$\vec{x}$]], [[$\vec{y}$]]) uses [[$\vec{x}$]] and [[$\vec{y}$]] (where $\vec{x}=(x_0, \ldots, x_{n-1})$ and $\vec{y}=(y_0, \ldots, y_{n-1})$) as input and outputs [[$\sum_{j=0}^{n-1} x_j y_j$]], that is, outputs the sum of products of j-th elements of two vectors.

TECHNICAL BACKGROUND (Secure Batch Mapping)

In embodiments of the present invention, secure batch mapping is used to perform secure computation of a sigmoid function $\sigma(x)$ which is a monotonically increasing function as shown in FIG. 1. Hereinafter, secure batch mapping will be described.

Secure batch mapping is a feature of calculating a look-up table and is a technique that can arbitrarily define a domain of definition and a range. A case where a function that multiplies input by 10 is calculated by secure batch mapping is taken as an example. Assume that a certain domain of definition X={1, 3, 5} and a range Y={10, 30, 50}, which is a set of values obtained by multiplying these values by 10, are prepared. In secure batch mapping, for input x that does not belong to the domain of definition, a maximum value that is less than or equal to x and belongs to the domain of definition is output. Therefore, 30 is output when 4 is input. However, by setting the domain of definition X and the range Y more finely, such as X={1, 2, 3, 4, 5} and Y={10, 20, 30, 40, 50}, 40 is output when 4 is input, which makes it possible to perform calculation with high precision. By using this property, it is possible to set appropriate precision that does not exceed the upper limit of a data type even when a fixed-point number is used and also makes a calculation error small. It is to be noted that the processing time of secure batch mapping depends on the size of a domain of definition and a range. Therefore, there is a trade-off between a high level of calculation precision and processing speed.
[Algorithm]

The following description deals with an algorithm (a secure sigmoid function calculation algorithm) that performs secure computation of a sigmoid function using secure batch mapping. For example, an algorithm for secure batch mapping described in Reference Non-patent Literature 5 can be used.
(Reference Non-patent Literature 5: Koki Hamada, Dai Ikarashi, and Koji Chida, "A Batch Mapping Algorithm for Secure Function Evaluation", The transactions of the Institute of Electronics, Information and Communication Engineers A, Vol. J96-A, No. 4, pp. 157-165, 2013.)

Secure batch mapping uses a share $[[\vec{x}]]=([[x_0]], \ldots, [[x_{m-1}]])$ of a vector $\vec{x}=(x_0, \ldots, x_{m-1})$ as input and outputs, using parameters $(a_0, \ldots, a_{k-1})$ representing the domain of definition of a function and parameters $(b_0, \ldots, b_{k-1})$ representing the range of the function (where $a_0, \ldots, a_{k-1}$ and $b_0, \ldots b_{k-1}$ are real numbers and satisfy $a_0 < \ldots < a_{k-1}$), shares onto which shares of elements of the vector were mapped, that is, $([[y_0]], \ldots, [[y_{m-1}]])$ which make $a_j \le x_i < a_{j+1}$ and $y_i = b_j$ hold for $0 \le i \le m-1$.

The secure sigmoid function calculation algorithm is an algorithm in which parameters $(a_0, \ldots, a_{k-1})$ representing the domain of definition of a function and parameters $(b_0, \ldots, b_{k-1})$ representing the range of the function in secure batch mapping are selected so as to satisfy $b_j = \sigma(a_j)$ ($0 \le j \le k-1$) (hereinafter, the secure batch mapping is represented as $map_\sigma$).

That is, the secure sigmoid function calculation algorithm uses a share $[[\vec{x}]]=([[x_0]], \ldots, [[x_{m-1}]])$ of a vector $\vec{x}=(x_0, \ldots, x_{m-1})$ as input and outputs $([[\sigma(a_{f(0)})]], \ldots, [[\sigma(a_{f(m-1)})]])$, in which $f(i)$ is $j$ that makes $a_j \le x_i < a_{j+1}$ hold for $0 \le i \le m-1$, by using the secure batch mapping $map_\sigma$ defined by parameters $(a_0, \ldots, a_{k-1})$ representing the domain of definition of the sigmoid function $\sigma(x)$ and parameters $(\sigma(a_0), \ldots, \sigma(a_{k-1}))$ representing the range of the sigmoid function $\sigma(x)$ (where k is an integer greater than or equal to 1 and $a_0, \ldots, a_{k-1}$ are real numbers that satisfy $a_0 < \ldots < a_{k-1}$).

As mentioned earlier, since a domain of definition and a range in secure batch mapping are values that can be arbitrarily set, they can be determined in accordance with necessary precision and processing speed. Thus, unlike a case where approximation is performed using a polynomial, an arbitrary precision value can be set. Therefore, it is also possible to achieve precision equivalent to plaintext, for example.

Moreover, performing secure computation of a sigmoid function using secure batch mapping has another advantage. This advantage will be described below. When calculation is performed using a fixed point (not a floating point) from the viewpoint of processing cost, numerical precision sometimes increases every time a multiplication is performed and exceeds the upper limit of a data type, which sometimes makes it necessary to intentionally perform truncate in the middle of processing. However, since using secure batch mapping allows a domain of definition and a range to be set independently, it is possible to calculate a sigmoid function and, at the same time, adjust numerical precision, which is efficient.

It is to be noted that, in the following description, the secure sigmoid function calculation algorithm is expressed as Sigmoid. Therefore, $Sigmoid([[\vec{x}]])=([[\sigma(a_{f(0)})]], \ldots, [[\sigma(a_{f(m-1)})]])$ holds.

(Logistic Regression Analysis)

A model $f(\vec{x})$ (where $\vec{x}=(x_1, \ldots, x_n)$) of a logistic regression analysis is expressed by the following formula using an n+1-dimensional vector $\vec{w}=(w_0, \ldots, w_n)$ as a model parameter.

$$f(\vec{x})=\sigma(-\vec{w}\cdot(1,\vec{x}))=\sigma(-(w_0+w_1x_1+\ldots+w_nx_n)) \quad (2)$$

Here, $(1, \vec{x})$ represents an n+1-dimensional vector $(1, x_1, \ldots, x_n)$.

As a method for learning the model parameter $\vec{w}$, there is the steepest descent method which is a learning method for searching for a minimum value of a function. In the steepest descent method, learning is performed using the following input and parameters.

(Input) Data $\vec{x_i}$ on an explanatory variable and data $y_i$ on a response variable ($0 \le i \le m-1$, where m is an integer greater than or equal to 1 and represents the number of pieces of learning data)

(Parameters) A learning rate $\eta$ ($0 < \eta < 1$) and the number of learning processes T It is assumed that appropriate values are set as the learning rate $\eta$ and the number of learning processes T.

$\vec{w_t}=(w_{0,t}, \ldots w_{n,t})$ is learned by the following formula as the model parameter obtained as a result of t ($0 \le t \le T-1$) updates.

$$w_{j,t+1} = w_{j,t} - \eta \cdot \frac{1}{m}\sum_{i=0}^{m-1}(\sigma(w_{0,t}+w_{1,t}x_{i,1}+\ldots+w_{n,t}x_{i,j})-y_i)x_{i,j} \quad (3)$$

That is, an update is performed for each j-th element $w_j$ of the model parameter $\vec{w}$ using the learning data $\vec{x_i}$ and $y_i$. It is assumed that an appropriate value is set as an initial value $\vec{w_0}$ of the model parameter $\vec{w}$.

[Algorithm]

The following description deals with an algorithm (a secure logistic regression calculation algorithm) that performs secure computation of a model parameter of a logistic regression model. The secure logistic regression calculation algorithm uses a share $[[\vec{x_i}]]$ of the data on the explanatory variable and a share $[[y_i]]$ of the data $y_i$ on the response variable as input, calculates a share $[[\vec{w}]]$ of the model parameter using the parameters $\eta$ and T which are public values, and outputs the share $[[\vec{w}]]$. A specific procedure is shown in FIG. 2. It is clear from FIG. 2 that $[[\vec{w}]]$ is calculated in accordance with the formula (3) in Steps 4 to 23. Moreover, it is also clear that the value of the sigmoid function is determined in Step 10 using the secure sigmoid function calculation algorithm Sigmoid.

Using the secure sigmoid function calculation algorithm Sigmoid enhances the precision of calculation of the sigmoid function, which also enhances the precision of calculation of logistic regression as compared with the existing methods (the methods described in Non-patent Literatures 1 to 3). Moreover, in the methods described in Non-patent Literatures 2 and 3, some of the values cannot be concealed in the course of calculation, which causes a security problem; by contrast, it is clear from each step of the secure logistic regression calculation algorithm that a secure is kept in the course of calculation, which makes it possible to perform calculations securely without leaking information at all to the outside.

Furthermore, when the sigmoid function is calculated using secure batch mapping, by using the property of being able to adjust the accuracy of approximation concurrently with this calculation, it is possible to perform even calculation of the logistic regression analysis, in which a multiplication has to be performed repeatedly, without exceeding the upper limit of a data type.

Application Example

As mentioned earlier, precision can be arbitrarily set in secure batch mapping; since overhead proportional to the size of a range and a domain of definition is required, it is necessary to consider a balance between precision and overhead in order to perform secure computation of the sigmoid function more efficiently. For example, by setting precision at a precision of the order of $10^{-4}$, it is possible to perform calculation with a high degree of precision while keeping the size of a domain of definition and a range small as compared with plaintext.

Moreover, in the logistic regression analysis, a value near x=0 is often used as a threshold at the time of final binary classification; therefore, the accuracy of approximation of the sigmoid function near x=0 is preferably high. As is clear from FIG. 1, the value of the sigmoid function changes greatly near x=0; however, the value is almost constant in other areas. Therefore, by using this property of the sigmoid function and finely setting a domain of definition and a range in a portion where the value changes greatly and coarsely setting them in other areas, it is possible to increase precision efficiently without increasing the size of a domain of definition and a range as a whole.

First Embodiment

Figure 3:
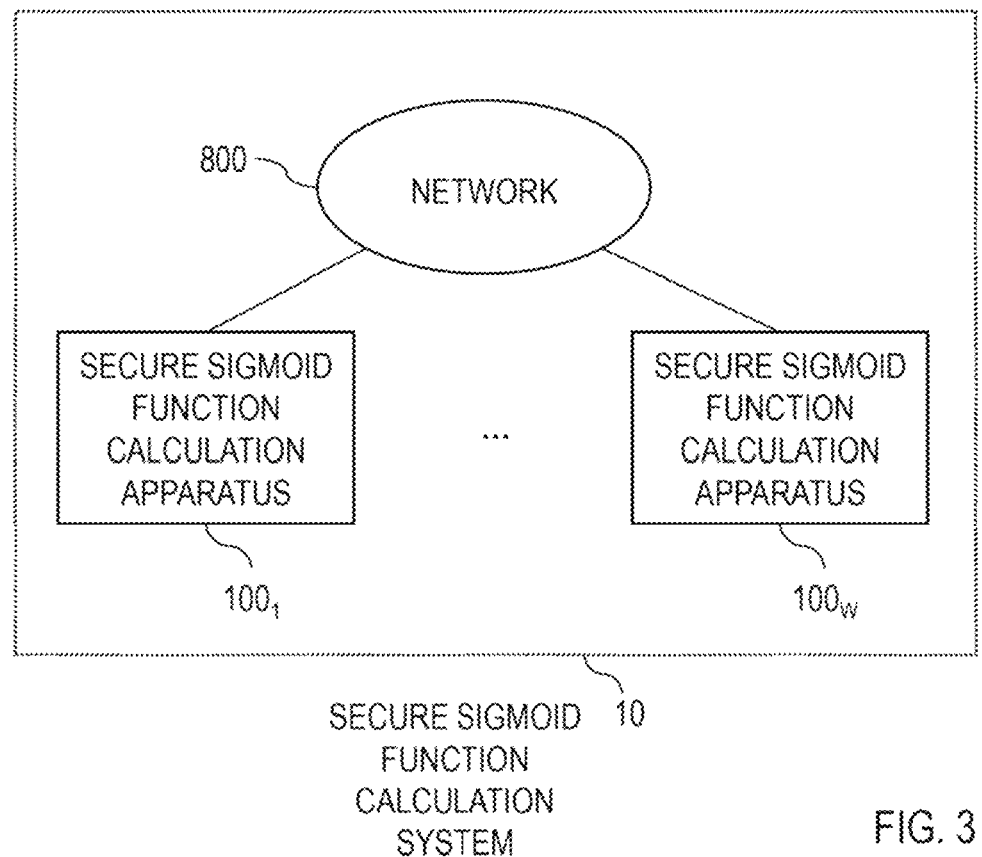
FIG. 3 is a block diagram showing the configuration of a secure sigmoid function calculation system 10.
Figure 4:
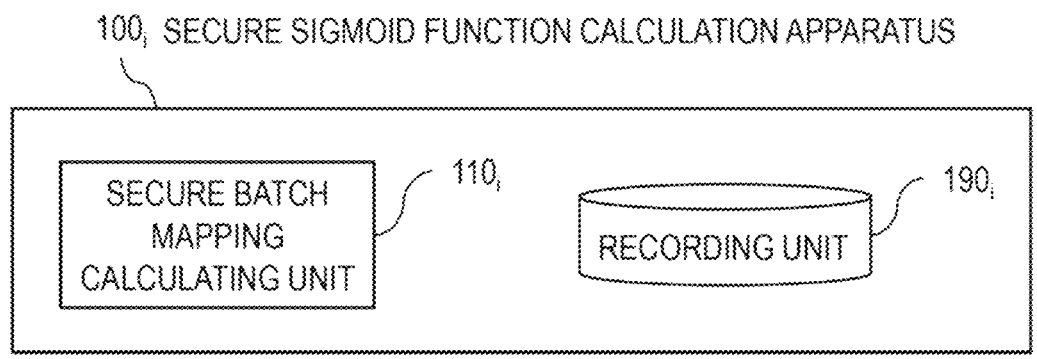
FIG. 4 is a block diagram showing the configuration of a secure sigmoid function calculation apparatus $100_i$.
Figure 5:
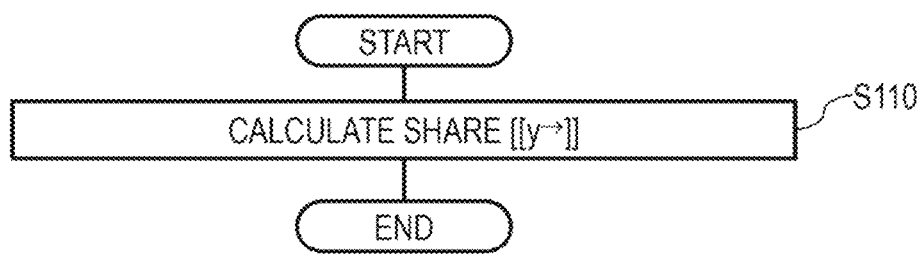
FIG. 5 is a flowchart showing an operation of the secure sigmoid function calculation system 10.

Hereinafter, a secure sigmoid function calculation system 10 will be described with reference to FIGS. 3 to 5. FIG. 3 is a block diagram showing the configuration of the secure sigmoid function calculation system 10. The secure sigmoid function calculation system 10 includes W (W is a predetermined integer greater than or equal to 3) secure sigmoid function calculation apparatuses $100_1, \ldots, 100_W$. The secure sigmoid function calculation apparatuses $100_1, \ldots, 100_W$ are connected to a network 800 and can communicate with one another. The network 800 may be, for example, a communications network such as the Internet or a broadcast communication channel FIG. 4 is a block diagram showing the configuration of a secure sigmoid function calculation apparatus 100; (1≤i≤W). FIG. 5 is a flowchart showing an operation of the secure sigmoid function calculation system 10.

As shown in FIG. 4, the secure sigmoid function calculation apparatus $100_i$ includes a secure batch mapping calculating unit $110_i$ and a recording unit $190_i$. Each of the constituent units of the secure sigmoid function calculation apparatus $100_i$ except the recording unit $190_i$ is configured so as to be capable of executing, of computations which are required in the secure sigmoid function calculation algorithm, that is, at least concealment, addition, multiplication, hpsum, and secure batch mapping, computations which are required to implement the function of each constituent unit. In the present invention, as specific functional configurations for implementing individual computations, configurations that can execute the algorithms which are disclosed in, for example, Reference Non-patent Literatures 1 to 5 serve the purpose, and their detailed explanations will be omitted because they are the existing configurations. Moreover, the recording unit $190_i$; is a constituent unit that records information which is necessary for processing which is performed by the secure sigmoid function calculation apparatus $100_i$. For example, the recording unit $190_i$ records the parameters $(a_0, \ldots, a_{k-1})$ representing the domain of definition of the sigmoid function σ(x) and the parameters $(\sigma(a_0), \ldots, \sigma(a_{k-1}))$ representing the range of the sigmoid function σ(x) (where k is an integer greater than or equal to 1 and $a_0, \ldots, a_{k-1}$ are real numbers that satisfy $a_0 < \ldots < a_{k-1}$), which are required to define the secure batch mapping $map_\sigma$. As described earlier, by selecting the parameters $(a_0, \ldots, a_{k-1})$ in such a way that the space between adjacent points near x=0 (that is, −ε<x<ε, where ε (>0) is a predetermined real number) is relatively narrower than that in other areas (that is, x≤−ε or x≥ε) (or the number of points near x=0 is relatively larger than that in other areas), it is possible to increase the accuracy of approximation of the sigmoid function near x=0.

By cooperative computations which are performed by the W secure sigmoid function calculation apparatuses $100_i$, the secure sigmoid function calculation system 10 implements the secure sigmoid function calculation algorithm which is a multi-party protocol. Thus, a secure batch mapping calculating means 110 (which is not shown in the drawing) of the secure sigmoid function calculation system 10 is configured with the secure batch mapping calculating units $110_1, \ldots, 110_W$.

The secure sigmoid function calculation system 10 calculates, from a share $[[\vec{x}]]=([[x_0]], [[x_{m-1}]])$ of an input vector $\vec{x}=(x_0, x_{m-1})$, a share $[[\vec{y}]]=([[y_0]], [[y_{m-1}]])$ of a value $\vec{y}=(y_0, \ldots, y_{m-1})$ of the sigmoid function for the input vector $\vec{x}$. In general, it is assumed that calculating the sigmoid function for an input vector means calculating the value of the sigmoid function for each element of the input vector. Hereinafter, an operation of the secure sigmoid function calculation system 10 will be described in accordance with FIG. 5.

The secure batch mapping calculating means 110 calculates $map_\sigma([[\vec{x}]])=([[\sigma(a_{f(0)})]], \ldots, [[\sigma(a_{f(m-1)})]])$ (where f(i) (0≤i≤m−1) is j that makes $a_j \leq x_i < a_{j+1}$ hold) from the share $[[\vec{x}]]=([[x_0]], \ldots, [[x_{m-1}]])$ of the input vector $\vec{x}=(x_0, \ldots, x_{m-1})$ and calculates the share $[[\vec{y}]]$ by $([[y_0]], \ldots, [[y_{m-1}]])=([[\sigma(a_{f(0)})]], \ldots, [[\sigma(a_{f(m-1)})]])$ (S110).

According to the invention of the present embodiment, it is possible to perform secure computation of the sigmoid function with high speed and precision. In particular, it is possible to perform secure computation of the sigmoid function with precision equivalent to plaintext.

The invention of the present embodiment implements calculation of the sigmoid function, which is a nonlinear function whose secure computation is not easy, by using secure batch mapping. Therefore, using the feature of secure batch mapping that can arbitrarily define a domain of definition makes it possible to implement secure computation of the sigmoid function with higher precision by giving higher priority thereto than processing speed when necessary.

In the first embodiment, when a domain of definition and a range are set, an inverse function $\sigma^{-1}$ of the sigmoid function may be used.

That is, an inverse sigmoid function $\sigma^{-1}$ may be used when parameters $(a_0, \ldots, a_{k-1})$ representing the domain of definition of a function and parameters $(b_0, \ldots, b_{k-1})$ representing the range of the function are set. For example, after desired parameters $(b_0, \ldots, b_{k-1})$ are set, the value of $a_i$ corresponding to each $b_i$ (0≤i≤k−1) is calculated using the inverse sigmoid function $\sigma^{-1}$. In this way, the calculated $(a_0, \ldots, a_{k-1})$ may be used as parameters representing the domain of definition of a function and the desired parameters $(b_0, \ldots, b_{k-1})$ may be used as parameters representing the range of the function.

The inverse sigmoid function $\sigma^{-1}$ is as follows, for example.

$$\sigma^{-1}(x)=-\ln((1/x)-1)$$

Using the inverse function makes it possible to easily calculate the domain of definition and the range of a function whose gradient changes sharply like the sigmoid function.

Second Embodiment

Figure 6:
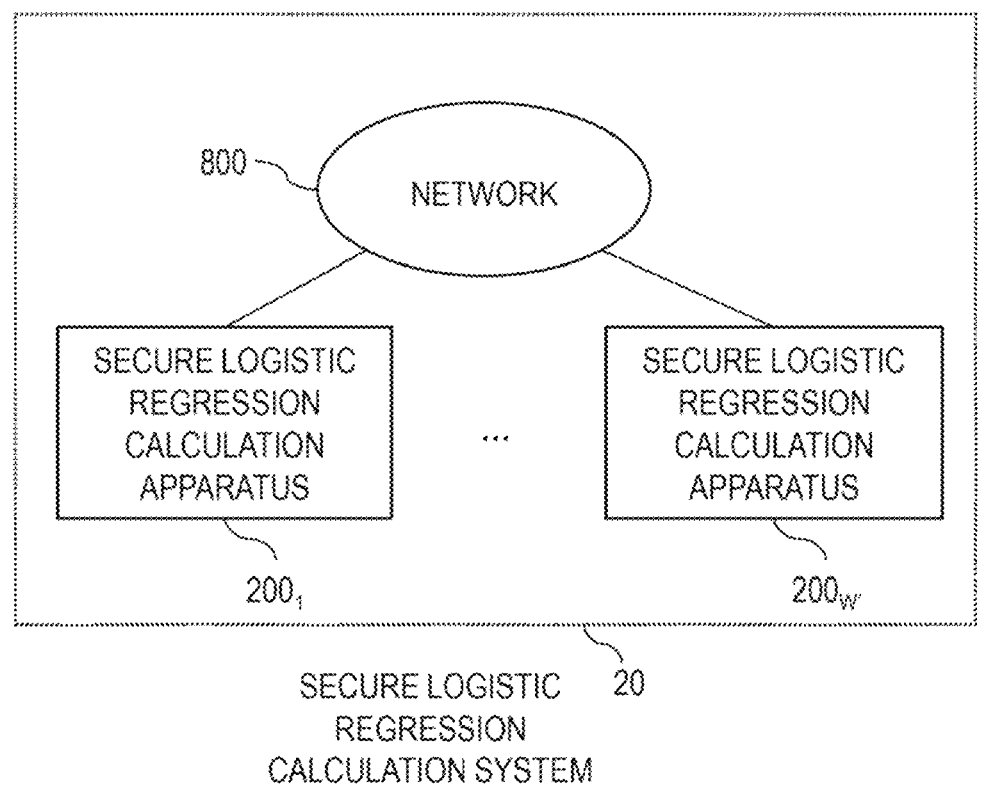
FIG. 6 is a block diagram showing the configuration of a secure logistic regression calculation system 20.

Hereinafter, a secure logistic regression calculation system 20 will be described with reference to FIGS. 6 to 8. FIG.

6 is a block diagram showing the configuration of the secure logistic regression calculation system 20. The secure logistic regression calculation system 20 includes W' (W' is a predetermined integer greater than or equal to 3) secure logistic regression calculation apparatuses $200_1, \ldots, 200_{W'}$. The secure logistic regression calculation apparatuses $200_1, \ldots, 200_{W'}$ are connected to a network 800 and can communicate with one another. The network 800 may be, for example, a communications network such as the Internet or a broadcast communication channel FIG. 7 is a block diagram showing the configuration of a secure logistic regression calculation apparatus 200; ($1 \le i \le W'$). FIG. 8 is a flowchart showing an operation of the secure logistic regression calculation system 20.

Figure 7:
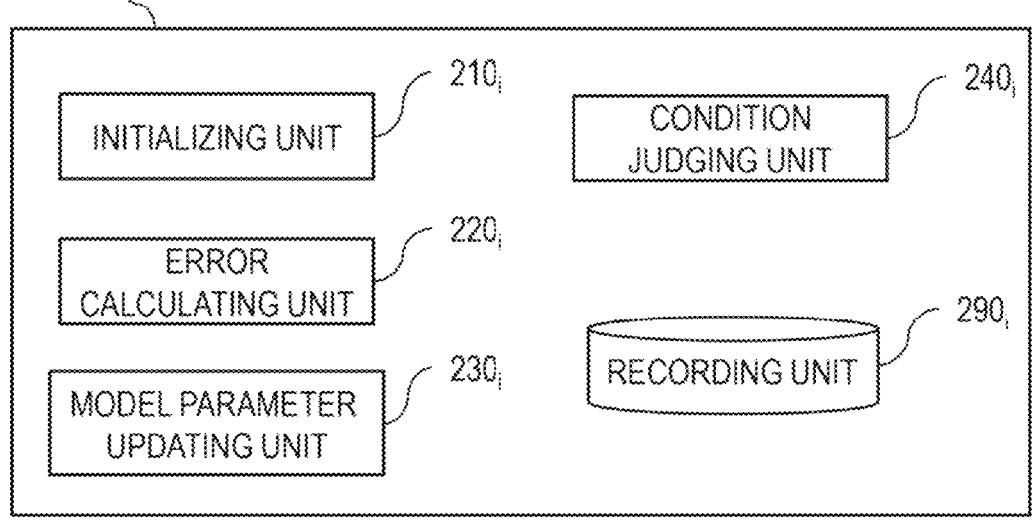
FIG. 7 is a block diagram showing the configuration of a secure logistic regression calculation apparatus $200_i$.
Figure 8:
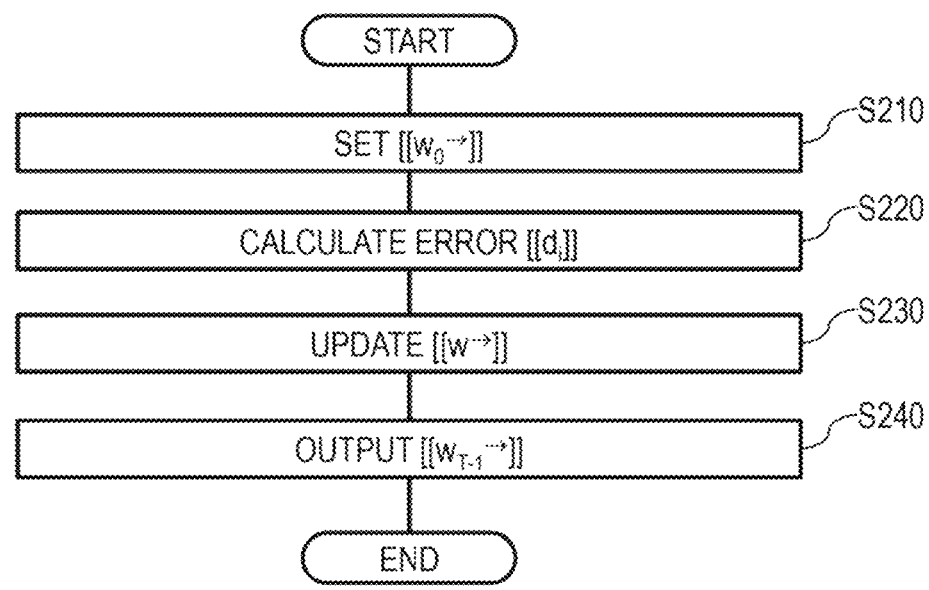
FIG. 8 is a flowchart showing an operation of the secure logistic regression calculation system 20.

As shown in FIG. 7, the secure logistic regression calculation apparatus $200_i$ includes an initializing unit $210_i$, an error calculating unit $220_i$, a model parameter updating unit $230_i$, a condition judging unit $240_i$, and a recording unit $290_i$. Each of the constituent units of the secure logistic regression calculation apparatus $200_i$ except the recording unit $290_i$ is configured so as to be capable of executing, of computations which are required in the secure logistic regression calculation algorithm, that is, at least concealment, addition, multiplication, hpsum, and secure batch mapping, computations which are required to implement the function of each constituent unit. In the present invention, as specific functional configurations for implementing individual computations, configurations that can execute the algorithms which are disclosed in, for example, Reference Non-patent Literatures 1 to 5 serve the purpose, and their detailed explanations will be omitted because they are the existing configurations. Moreover, the recording unit $290_i$ is a constituent unit that records information which is necessary for processing which is performed by the secure logistic regression calculation apparatus $200_i$. For example, the recording unit $290_i$ records the parameters η and T (where η is a real number that satisfies 0<η<1 and T is an integer greater than or equal to 1). Furthermore, the recording unit $290_i$ also records a parameter necessary for calculating the secure sigmoid function calculation algorithm Sigmoid. For example, the recording unit $290_i$ records the parameters $(a_0, \ldots, a_{k-1})$ and $(\sigma(a_0), \ldots, \sigma(a_{k-1}))$.

By cooperative computations which are performed by the W' secure logistic regression calculation apparatuses $200_i$, the secure logistic regression calculation system 20 implements the secure logistic regression calculation algorithm which is a multi-party protocol. Thus, an initializing means 210 (which is not shown in the drawing) of the secure logistic regression calculation system 20 is configured with the initializing units $210_1, \ldots, 210_{W'}$, an error calculating means 220 (which is not shown in the drawing) is configured with the error calculating units $220_1, \ldots, 220_{W'}$, a model parameter updating means 230 (which is not shown in the drawing) is configured with the model parameter updating units $230_1, \ldots, 230_{W'}$, and a convergence condition judging means 240 (which is not shown in the drawing) is configured with the condition judging units $240_1, \ldots, 240_{W'}$.

The secure logistic regression calculation system 20 calculates the share $[[w_i]]$ of the model parameter $\vec{w}$ of the logistic regression model from the share $[[\vec{x_i}]]$ ($0 \le i \le m-1$, where m is an integer greater than or equal to 1) of the data $\vec{x_i}$ on the explanatory variable and the share $[[y_i]]$ ($0 \le i \le m-1$) of the data $y_i$ on the response variable (see FIG. 2). Hereinafter, an operation of the secure logistic regression calculation system 20 will be described in accordance with FIG. 8.

The initializing means 210 sets a share $[[\vec{w_0}]]$ of the initial value $\vec{w_0}$ of the model parameter $\vec{w}$ (S210). Specifically, the initializing means 210 only has to set the share $[[\vec{w_0}]]$ of the appropriate initial value $\vec{w_0}$ recorded on the recording unit $290_i$ in advance. This corresponds to Step 1 of the secure logistic regression calculation algorithm of FIG. 2.

The error calculating means 220 calculates, for i=0, . . . , m−1, $[[b_i]]$ by $[[b_i]]=\text{hpsum}([[\vec{w_t}]], [[(1, \vec{x_i})]])$ from a share $[[\vec{w_t}]]$ of a value $\vec{w_t}$ of the model parameter $\vec{w}$ obtained as a result oft updates and the share $[[\vec{x_i}]]$, calculates $([[c_0]], \ldots, [[c_{m-1}]])$ by $([[c_0]], \ldots, [[c_{m-1}]])=\text{Sigmoid}(([[b_0]], \ldots, [[b_{m-1}]]))$ from $[[b_i]]$ ($0 \le i \le m-1$), and calculates, for i=0, . . . , m−1, an error $[[d_i]]$ by $[[d_i]]=[[c_i]]-[[y_i]]$ from the share $[[y_i]]$ and an i-th element $[[c_i]]$ of $([[c_0]], \ldots, [[c_{m-1}]])$ (S220). This corresponds to Steps 5 to 15 of the secure logistic regression calculation algorithm of FIG. 2. It is to be noted that Sigmoid only has to be calculated using the secure sigmoid function calculation system 10.

For j=0, . . . , n, the model parameter updating means 230 calculates $[[e]]$ by $[[e]]=\Sigma_{i=0}^{m-1}[[d_i]][[x_{i,j}]]$ from the error $[[d_i]]$ ($0 \le i \le m-1$) calculated in S220 and a j-th element $[[x_{i,j}]]$ ($0 \le i \le m-1$) of the share $[[\vec{x_i}]]$ and calculates, from a j-th element $[[w_{j,t}]]$ of the share $[[\vec{w_t}]]$ and $[[e]]$ by $[[w_{j,t+1}]]=[[w_{j,t}]]-\eta(1/m)[[e]]$, a j-th element $[[w_{j,t+1}]]$ of a share $[[\vec{w_{t+1}}]]$ of a value $\vec{w_{t+1}}$ of the model parameter $\vec{w}$ obtained as a result of t+1 updates (S230). This corresponds to Steps 16 to 21 of the secure logistic regression calculation algorithm of FIG. 2.

The convergence condition judging means 240 judges whether or not a repetition condition, that is, t<T, for model parameter update, which is set in advance, is satisfied. If the condition is satisfied, the processing from S220 to S230 is repeated; if the repetition condition is not satisfied (when the number of learning processes reaches a predetermined number of learning processes T), a share $[[\vec{w_{T-1}}]]$ is output as the share $[[\vec{w}]]$ of the model parameter $\vec{w}$ and the processing is ended (S240).

According to the invention of the present embodiment, it is possible to perform secure computation of a model parameter of a logistic regression model with high speed and precision.

First Modification of the Second Embodiment

The logistic regression analysis may be conducted using secure batch mapping and a right shift. Secure batch mapping has the property of being able to adjust numerical precision. However, when it is necessary to perform calculation with higher precision and/or when large learning data is used, precision may be further adjusted using a right shift. It is to be noted that, when simply written as a right shift, it means an arithmetic right shift.

It is to be noted that, in a first modification of the second embodiment, secure computation is performed on a fixed-point number to reduce processing cost. That is, it is assumed that, when a value such as w, which is an object on which secure computation is to be performed, contains a decimal fraction, secure computation is performed on a value obtained by multiplying the above value by $2^b$. In this case, by calculating a value obtained by dividing the result of the secure computation by $2^b$, the result of secure computation corresponding to the value on which secure computation was to be originally performed is obtained. b in this case is referred to as precision.

That is, in the first modification of the second embodiment, when an arbitrary value, which is an object on which secure computation is to be performed, is assumed to be p and the precision of p is written as b_p [bit], it means that a share [[p]] of p is actually a share [[p×$2^{b\_p}$]] of a fixed-point number.

Moreover, when an arbitrary vector, which is an object on which secure computation is to be performed, is assumed to be $\vec{q}$, an element of $\vec{q}$ is assumed to be $q_i$, and the precision of $\vec{q}$ is written as b_q [bit], it means that a share [[$\vec{q}$]] of $\vec{q}$ is actually made up of a share [[$q_i$×$2^{b\_q}$]] of a fixed-point number.

It is to be noted that multiplication by $2^b$ is performed by, for example, a secure logistic regression calculation apparatus 200 at an appropriate time. An example of an appropriate time is when data, which is an object on which secure computation is to be performed, is registered on the secure logistic regression calculation apparatus 200, when an object on which secure computation is to be performed is converted to a share from plaintext, or before secure computation.

Furthermore, division by $2^b$ is performed by, for example, the secure logistic regression calculation apparatus 200 at an appropriate time. An example of an appropriate time is when the result of secure computation is returned to a client who has made a request to perform secure computation, when a share is converted to plaintext, or after secure computation.

For this reason, in the following description, multiplication by $2^b$ and division by $2^b$ are not mentioned in some cases.

The precision of $\vec{w}$, $\vec{w_0}$, $\vec{w_t}$, $\vec{w_{t+1}}$, and eta_grad_ave_shift is written as b_w [bit], the precision of $\vec{x_i}$ (0≤i≤m−1) is written as b_x [bit], the precision of $y_i$ (0≤i≤m−1), $c_i$ (0≤i≤m−1), and $d_i$ (0≤i≤m−1) is written as b_y [bit], the precision of η is written as b_η [bit], the precision of the reciprocal 1/m of the number of pieces of learning data is written as b_m+H [bit], the precision of $b_i$ (0≤i≤m−1) is written as b_w+b_x [bit], the precision of e is written as b_y+b_x [bit], the precision of eta_grad is written as b_y+b_x+b_η [bit], the precision of eta_grad_shift is written as b_tmp [bit], and the precision of eta_grad_ave is written as b_tmp+b_m+H [bit]. b_w, b_x, b_y, b_η, b_m, H, and b_tmp are positive integers which are determined in advance in accordance with the performance of a computer that performs secure computation. Here, H satisfies H≥$\log_2$ (m).

Moreover, since it is not easy to perform division in secure computation, calculation of 1/m is performed in advance using plaintext by using the fact that the number of pieces of data m is obtained as plaintext. By doing so, it is possible to perform calculation as multiplication by 1/m in secure computation. In doing so, to guarantee the precision b_m [bit] of 1/m, it is necessary to multiply 1/m by $2^{b\_m+H}$.

Hereinafter, a difference from the secure logistic regression calculation apparatus 200 of the second embodiment will be mainly described.

The processing which is performed by the initializing means 210 in S210 and the processing which is performed by the error calculating means 220 in S220 are the same as those described above. In the first modification of the second embodiment, the model parameter updating means 230 performs the following processing.

For j=0, . . . , n, the model parameter updating means 230 calculates [[e]] by [[e]]=$\Sigma_{i=0}^{m-1}$[[$d_i$]][[$x_{i,j}$]] from the error [[$d_i$]] (0≤i≤m−1) calculated in S220 and a j-th element [[$x_{i,j}$]] (0≤i≤m−1) of the share [[$\vec{x_i}$]].

Next, the model parameter updating means 230 calculates [[eta_grad]]=[[e]] from η and [[e]]. When a maximum value of i is in (that is, the number of pieces of data is in), the amount of memory required by eta_grad is b_y+b_x+b_η+ceil($\log_2$ (m)) [bit]. Since this value increases and overflows, rshift is performed in next processing. Here, ceil means rounding up.

Then, the model parameter updating means 230 calculates [[eta_grad_shift]]=rshift([[eta_grad]], b_y+b_x+b_tmp) from [[eta_grad]]. Here, rshift(a, b) means shifting a value a to the right by b [bit] by performing an arithmetic right shift. Since eta_grad requires b_y+b_x+b_η+ceil($\log_2$ (m)) [bit]-memory (an example: 55 bits when b_y=14, b_x=17, b_η=7, and m=100,000), if eta_grad_ave is calculated without performing a right shift, this value further increases by b_m+H (an example: b_m=17 and H=17) [bit], which may cause the value to overflow. Depending on the performance of a machine, in general, the value overflows when it exceeds 64 bits. It is to be noted that sometimes a smaller amount of memory can be handled in secure computation.

Next, the model parameter updating means 230 calculates [[eta_grad_ave]]=(1/m)[[eta_grad_shift]] from [[eta_grad_shift]].

Then, the model parameter updating means 230 calculates [[eta_grad_ave_shift]]=rshift([[eta_grad_ave]], b_tmp+b_m+H−b_w) from [[eta_grad_ave]].

Finally, the model parameter updating means [[unit]] 230 calculates, from a j-th element [[$w_{j,t}$]] of the share [[$\vec{w_t}$]] and [[eta_grad_ave_shift]] by [[$w_{j,t+1}$]]=[[$w_{j,t}$]]−[[eta_grad_ave_shift]], a j-th element [[$w_{j,t+1}$]] of a share [[$\vec{w_{t+1}}$]] of a value $\vec{w_{t+1}}$ of the model parameter $\vec{w}$ obtained as a result of t+1 updates.

The processing which is performed by the convergence condition judging means [[unit]] 240 is the same as that described above.

It is to be noted that the following processing, for example, only has to be performed to convert a logical right shift to an arithmetic right shift. It is to be noted that, in the following description, rlshift(a, b) means shifting a to the right by b [bit] by performing a logical right shift. In the following description, it is explicitly indicated that secure computation has been performed on a value obtained by multiplication by $2^b$. Therefore, for example, [[B×$2^n$]] literally means that a value B×$2^n$ has been shared.

When a right shift of a value a whose precision is n [bit] is performed to change the precision to m [bit], addition of a value A, whose precision is n [bit] and which makes |a|≤A hold, is performed. Assume that n>m holds.

$$B \times 2^n = a \times 2^n + A \times 2^n$$

A logical right shift is performed to shift B×$2^n$ to the right by n-m [bit].

$$B \times 2^m = \text{rlshift}(B \times 2^n, n-m)$$

Subtraction of A added before the shift is performed.

$$a \times 2^m = B \times 2^m - A \times 2^m$$

That is, since the precision of eta_grad is b_y+b_x+b_η, the model parameter updating means [[unit]] 230 first sets a value A whose precision is b_y+b_x+b_η and which makes |eta_grad|≤A hold. Then, the model parameter updating means [[unit]] 230 calculates a share [[B×$2^n$]] of B×$2^n$ that satisfies B×$2^n$=eta_grad×$2^n$+A×$2^n$. The model parameter updating unit 230 then calculates a share [[B×$2^n$]] of B×$2^n$ that satisfies B×$2^m$=rlshift ([[B×$2^n$]], b_y+b_x+b_η−(b_y+b_x+b_η−b_tmp)) based on the calculated share [[B×$2^n$]]. Then, the model parameter updating unit 230 calculates a share [[a×$2^m$]] of a×$2^m$ that satisfies a×$2^m$=B×$2^m$−A×$2^m$ based on the calculated share [[B×$2^n$]]. The calculated [[a×$2^m$]] is [[eta_grad_shift]] in the above description.

Moreover, since the precision of eta_grad_ave is b_tmp+b_m+H, the model parameter updating means [[unit]] 230 first sets a value A whose precision is b_tmp+b_m+H and which makes |eta_grad_ave|≤A hold. Then, the model parameter updating means[[unit]] 230 calculates a share [[B×$2^n$]] of B×$2^n$ that satisfies B×$2^n$=eta_grad_ave×$2^n$+A×$2^n$. The model parameter updating unit 230 then calculates a share [[B×$2^n$]] of B×$2^n$ that satisfies B×$2^m$=rlshift ([[B×$2^n$]], b_tmp+b_m+H−(b_tmp+b_m+H−b_w)) based on the calculated share [[B×$2^n$]]. Then, the model parameter updating unit 230 calculates a share [[a×$2^m$]] of a×$2^m$ that satisfies a×$2^m$=B×$2^m$−A×$2^m$ based on the calculated share [[B×$2^n$]]. The calculated [[a×$2^m$]] is [[eta_grad_ave_shift]] in the above description.

As described above, by adopting a right shift, it is possible to perform calculation with higher precision and perform processing of large-scale learning data.

It can be said that, since batch mapping which is not common in the architecture of plaintext is used also in the first modification, the first modification is not obvious because specific processing is different from processing that would be obtained by performing processing of plaintext as it is by secure computation.

Moreover, specific fixed-point logistic regression including adjustment of precision has never been configured under conditions where the number of bits, which is determined by the performance of a computing machine used, is limited.

Since batch mapping has the effect of making a precision adjustment, this precision adjustment is not the same as a precision adjustment which is performed in the case of plaintext, and has a property that is unique to secure computation.

These points apply to second and subsequent modifications, which will be described below.

Second Modification of the Second Embodiment

A right shift (rshift) may be replaced by approximation of η/m by a power of 2. In the first modification of the second embodiment, it is possible to make fine settings by increasing the precision of the learning rate η. However, in the first modification of the second embodiment, two right shift operations are necessary and the values of b_y+b, x+b_η, and b_tmp+b_m+H tend to be large values, which may reduce the efficiency of calculation. For this reason, in a second modification of the second embodiment, by performing processing using η/m by combining multiplication by η and multiplication by 1/m, the number of processing operations is reduced and calculation efficiency is increased.

Although the second modification of the second embodiment achieves higher processing efficiency than the first modification of the second embodiment, it does not allow the learning rate η to be finely set. However, this poses little problem because a difference in learning rate does not affect very much the quality of the parameter obtained as the final result.

It is to be noted that, in the second modification of the second embodiment, secure computation is performed on a fixed-point number to reduce processing cost. That is, it is assumed that, when a value such as w, which is an object on which secure computation is to be performed, contains a decimal fraction, secure computation is performed on a value obtained by multiplying the above value by $2^b$. In this case, by calculating a value obtained by dividing the result of the secure computation by $2^b$, the result of secure computation corresponding to the value on which secure computation was to be originally performed is obtained. b in this case is referred to as precision.

That is, in the second modification of the second embodiment, when an arbitrary value, which is an object on which secure computation is to be performed, is assumed to be p and the precision of p is written as b_p [bit], it means that a share [[p]] of p is actually a share [[p×$2^{b\_p}$]] of a fixed-point number.

Moreover, when an arbitrary vector, which is an object on which secure computation is to be performed, is assumed to be $\vec{q}$, an element of $\vec{q}$ is assumed to be $q_i$, and the precision of $\vec{q}$ is written as b_q [bit], it means that a share [[$\vec{q}$]] of $\vec{q}$ is actually made up of a share [[$q_i$×$2^{b\_q}$]] of a fixed-point number.

It is to be noted that multiplication by $2^b$ is performed by, for example, a secure logistic regression calculation apparatus 200 at an appropriate time. An example of an appropriate time is when data, which is an object on which secure computation is to be performed, is registered on the secure logistic regression calculation apparatus 200, when an object on which secure computation is to be performed is converted to a share from plaintext, or before secure computation.

Furthermore, division by $2^b$ is performed by, for example, the secure logistic regression calculation apparatus 200 at an appropriate time. An example of an appropriate time is when the result of secure computation is returned to a client who has made a request to perform secure computation, when a share is converted to plaintext, or after secure computation.

For this reason, in the following description, multiplication by $2^b$ and division by $2^b$ are not mentioned in some cases.

The precision of $\vec{w}$, $\vec{w_0}$, $w_t'$, $\vec{w_{t+1}}$, and eta_grad_ave is written as b_w [bit], the precision of $\vec{x_i}$ (0≤i≤m−1) is written as b_x [bit], the precision of $y_i$ (0≤i≤m−1), $c_i$ (0≤i≤m−1), and $d_i$ (0≤i≤m−1) is written as b_y [bit], the precision of η is written as b_η [bit], the precision of $b_i$ (0≤i≤m−1) is written as b_w+b_x [bit], and the precision of e is written as b_y+b_x [bit]. b_w, b_x, b_y, and b_η are positive integers which are determined in advance in accordance with the performance of a computer that performs secure computation.

Hereinafter, a difference from the secure logistic regression calculation apparatus 200 of the second embodiment will be mainly described.

The processing which is performed by the initializing means 210 in S210 and the processing which is performed by the error calculating means 220 in S220 are the same as those described above. In the second modification of the second embodiment, the model parameter updating means 230 performs the following processing.

For j=0, n, the model parameter updating means 230 calculates [[e]] by [[e]]=$\Sigma_{i=0}^{m-1}$[[$d_i$]][[$x_{i,j}$]] from the error [[$d_i$]] (0≤i≤m−1) calculated in S220 and a j-th element [[$x_{i,j}$]] (0≤i≤m−1) of the share [[$\vec{x_i}$]]. Since memory required by e is b_y_b_x+ceil(log_2(m))=48 [bit] when b_y=14, b_x=17, and m=100,000, there is more space in memory as compared with the first modification. That is, it is possible to store larger learning data therein because overflow does not occur even when the number of pieces of data m is increased.

Next, the model parameter updating means 230 calculates [[eta_grad_ave]]=rshift([[e]], X+b_y+b_x−b_w) from [[e]]. Here, X is a value that approximates η/m by division by $2^X$ and is calculated as follows, for example floor is a function representing rounding down. X is calculated by the secure logistic regression calculation apparatus 200 before secure computation.

$$X=-(\mathrm{floor}(\log_2(\eta/m)))$$

Finally, the model parameter updating means[[unit]] 230 calculates, from a j-th element [[$w_{j,t}$]] of the share [[$w_t^\rightarrow$]] and [[eta_grad_ave]] by [[$w_{j,\ t+1}$]]=[[$w_{j,\ t}$]]−[[eta_grad_ave]], a j-th element [[$w_{j,\ t+1}$]] of a share [[$w_{t+1}^\rightarrow$]] of a value $w_{t+1}^\rightarrow$ of the model parameter $w^\rightarrow$ obtained as a result of t+1 updates.

The processing which is performed by the convergence condition judging means[[unit]] 240 is the same as that described above.

As in the case of the first modification of the second embodiment, the following processing, for example, only has to be performed to convert a logical right shift to an arithmetic right shift. It is to be noted that consideration has to be given to X in the second modification of the second embodiment. In the following description, it is explicitly indicated that secure computation has been performed on a value obtained by multiplication by 2b. Therefore, for example, [[$B\times 2^n$]] literally means that a value $B\times 2^n$ has been shared.

When a right shift of a value a whose precision is n [bit] is performed to change the precision to m [bit] and, at the same time, division by $2^X$ is performed, addition of a value A, whose precision is n [bit] and which makes |a|≤A hold, is performed.

$$B\times 2^n = a\times 2^n + A\times 2^n$$

A logical right shift is performed to shift $B\times 2^n$ to the right by n−m+X [bit].

$$B\times 2^m/(2^X)=\mathrm{rlshift}(B\times 2^n, n-m+X)$$

Subtraction of A added before the shift is performed.

$$a\times 2^m/2^X = B\times 2^m/2^X - A\times 2^m/2^X$$

Since the precision of e is b_y+b_x, the model parameter updating unit 230 first sets a value A whose precision is b_y+b_x and which makes |e|≤A hold. Then, the model parameter updating means[[unit]] 230 calculates a share [[$B\times 2^n$]] of $B\times 2^n$ that satisfies $B\times 2^n = e\times 2^n + A\times 2^n$. The model parameter updating unit means[[230]] then calculates a share [[$B\times 2^m/(2^X)$]] of $B\times 2^m/(2^X)$ that satisfies $B\times 2^m/(2^X)=\mathrm{rlshift}$ ([[$B\times 2^n$]], b_y+b_x−(X+b_y+b_x−b_w)+X) based on the calculated share [[$B\times 2^n$]]. Then, the model parameter updating unit 230 calculates a share [[$a\times 2^m/2^X$]] of $a\times 2^m/2^X$ that satisfies $a\times 2^m/2^X = B\times 2^m/2^X - A\times 2^m/2^X$ based on the calculated share [[$B\times 2^m/(2^X)$]]. The calculated [[$a\times 2^m/2^X$]] is [[eta_grad_ave]] in the above description.

As described above, by adopting a right shift, it is possible to perform calculation with higher precision and perform processing of large-scale learning data.

Third Modification of the Second Embodiment

When logistic regression of the second embodiment is performed, normalization may be performed using a right shift with data being concealed. Normalization, which is preprocessing to make all the data with different ranges, such as height and age, fall within a specific area such as from 0 to 1, is often used in machine learning in general. Therefore, in order to make machine learning on secure computation actually operational, normalization needs to be able to be performed on secure computation.

When a certain data string $x^\rightarrow = x_0, x_1, \ldots, x_m$ is normalized such that $0 \leq \hat{x}_i \leq 1$ ($\hat{x}_i$ is an arbitrary element of $\hat{x}^\rightarrow$) holds, a shift amount S having the following property is calculated using a maximum value $\max_{x^\rightarrow}$ and a minimum value $\min_{x^\rightarrow}$ of $x^\rightarrow$.

$$2^S \geq \max(|\max_{x^\rightarrow}|, |\min_{x^\rightarrow}|) \quad (A)$$

max (a, b) represents a value a or a value b, whichever is greater. By performing the following calculation using the shift [[S]] amount S obtained by the above-described calculation, normalization can be performed such that $0 \leq \hat{x}_i \leq 1$ holds.

$$\hat{x}^\rightarrow = \mathrm{rshift}(x^\rightarrow, S)$$

When a model parameter $\hat{w}^\rightarrow = \hat{w}_0, \hat{w}_1, \ldots, \hat{w}_n$ obtained by performing learning using $\hat{x}^\rightarrow$ is converted to a parameter $w^\rightarrow$ which would be obtained if calculation was performed without normalization, it is only necessary to perform the following calculation.

$$w^\rightarrow = \hat{w}^\rightarrow \times 2^{-S} \quad (B)$$

Hereinafter, a difference from the secure logistic regression calculation apparatus 200 of the second embodiment will be mainly described.

The secure logistic regression calculation apparatus 200 of a third modification of the second embodiment first calculates, for each explanatory variable $x_j^\rightarrow$, a shift amount $S_j$ (j=0, 1, ..., n) that satisfies the above-described formula (A). Then, the secure logistic regression calculation apparatus 200 calculates [[$\hat{x}_j^\rightarrow$]]=rshift ([[$x_j^\rightarrow$]], $S_j$) using the calculated shift amount [[S]]$S_i$ and [[$x_j^\rightarrow$]]. The secure logistic regression calculation apparatus 200 calculates a share of [[$\hat{w}^\rightarrow$]] the model parameter by performing the above-described processing which is performed by the initializing means 210, the error calculating means 220, and the model parameter updating means 230 using [[$\hat{x}_i^\rightarrow$]] in place of [[$x_i^\rightarrow$]]. Finally, the secure logistic regression calculation apparatus 200 calculates [[$w^\rightarrow$]]=[[$\hat{w}^\rightarrow$]]$\times 2^{-S}$ using [[$\hat{w}^\rightarrow$]].

As described above, by performing normalization, it is possible to make machine learning on secure computation actually operational.

Fourth Modification of the Second Embodiment

When logistic regression of the second embodiment is performed, the Nesterov accelerated gradient (NAG) method may be applied. Performing parameter learning using a simple gradient descent method results in low learning efficiency; therefore, in actuality, an optimization technique is often adopted to increase learning efficiency. However, since many optimization techniques include calculations, such as division, which are difficult for secure computation to perform, it is not easy to adopt an optimization technique when performing parameter learning in secure computation. Under these circumstances, the NAG method is an optimization technique that can be implemented only by addition/subtraction and multiplication, which makes it possible to adopt the NAG method into secure computation at low cost.

A parameter learning formula in the gradient descent method is as follows.

$$w_{j,t+1}=w_{j,t}-\Theta(1/m)\Sigma_{i=0}^m (f(x_i^\rightarrow)_t - y_i)x_{i,j}$$

$$f(x_i^\rightarrow)=\sigma(w^\rightarrow \cdot (1, x_i^\rightarrow))$$

On the other hand, a parameter learning formula which is used when the NAG method is applied is as follows.

$$v_{j,t+1} = \alpha v_{j,t} - \eta(1/m)\Sigma_{i=0}^{m}(f(x_i^{\rightarrow})_t - y_i)x_{i,j}$$

$$w_{j,t+1} = w_{j,t} - v_{j,t+1}$$

$$f(x_i^{\rightarrow}) = \sigma(\theta^{\rightarrow} \cdot (1, x_i^{\rightarrow}))$$

$$\theta^{\rightarrow} = w^{\rightarrow} - \alpha v^{\rightarrow}$$

$v^{\rightarrow}$ is a weight vector that is newly added in a fourth modification of the second embodiment. $\alpha$ is a parameter (an attenuation factor) which makes $0 \leq \alpha \leq 1$ hold, and can be arbitrarily set. The fourth modification of the second embodiment, which is a modification that is obtained when the NAG method is applied to the second modification of the second embodiment, is as follows.

Hereinafter, a difference from the secure logistic regression calculation apparatus 200 of the second modification of the second embodiment will be mainly described. Overlapping explanations of portions similar to those of the second modification of the second embodiment will be omitted.

The precision of $w^{\rightarrow}$, $w_0^{\rightarrow}$, $w_t^{\rightarrow}$, $w_{t+1}^{\rightarrow}$, and eta_grad_ave is written as b_w [bit], the precision of $x_i^{\rightarrow}$ ($0 \leq i \leq m-1$) is written as b_x [bit], the precision of $y_i$ ($0 \leq i \leq m-1$), $c_i$ ($0 \leq i \leq m-1$), and $d_i$ ($0 \leq i \leq m-1$) is written as b_y [bit], the precision of $b_i$ ($0 \leq i \leq m-1$) is written as b_w+b_x [bit], the precision of e is written as b_y+b_x [bit], the precision of the attenuation factor $\alpha$ is written as b_$\alpha$, the precision of $v^{\rightarrow}$, $v_0^{\rightarrow}$, $v_t^{\rightarrow}$, and $v_{t+1}^{\rightarrow}$[,] is written as b_v, and the precision of alpha_v is written as b_v+b_$\alpha$. b_w, b_x, b_y, and b_$\alpha$ are positive integers which are determined in advance in accordance with the performance of a computer that performs secure computation. It is to be noted that b_v+b_$\alpha$ may be set such that b_v+b_$\alpha$=b_w holds. This makes it easy to perform processing.

In addition to the share [[$w_0^{\rightarrow}$]] of the initial value $w_0^{\rightarrow}$ of the model parameter $w^{\rightarrow}$, the initializing means 210 sets a share [[$v_0^{\rightarrow}$]] of an initial value $v_0^{\rightarrow}$ of the weight vector $v^{\rightarrow}$ (S210). Specifically, the initializing means 210 only has to set the share [[$w_0^{\rightarrow}$]] of the appropriate initial value $w_0^{\rightarrow}$ recorded on the recording unit $290_i$ in advance and the share [[$v_0^{\rightarrow}$]] of the appropriate initial value $v_0^{\rightarrow}$ recorded on the recording unit $290_i$ like in advance.

The error calculating means 220 first calculates $\theta^{\rightarrow} = w^{\rightarrow} - \alpha v^{\rightarrow}$. Then, the error calculating means 220 performs calculation of an error using $\theta^{\rightarrow}$ in place of $w^{\rightarrow}$ in the same manner as that described above.

In the fourth modification of the second embodiment, the model parameter updating means 230 performs the following processing.

For j=0, . . . , n, the model parameter updating means 230 calculates [[e]] by [[e]]=$\Sigma_{i=0}^{m-1}$[[$d_r$]][[$x_{i,j}$]] from the error [[$d_r$]] ($0 \leq i \leq m-1$) calculated in S220 and a j-th element [[$x_{i,j}$]] ($0 \leq i \leq m-1$) of the share [[$x_i^{\rightarrow}$]].

The model parameter updating means 230 calculates [[eta_grad_ave]]=rshift([[e]], X+b_y+b_x−b_w) from [[e]] in the same manner as that of the second modification of the second embodiment.

The model parameter updating means 230 calculates [[alpha_v]]=$\alpha$[[$v_{j,t}$]] from $\alpha$ and a j-th element [[$v_{j,t}$]] ($0 \leq i \leq m-1$) of a share [[$v_t^{\rightarrow}$]].

The model parameter updating means 230 calculates, by [[$v_{j,t+1}$]]=[[alpha_v]]−[[eta_grad_ave]], a j-th element [[$v_{j,t+1}$]] of a share [[$v_{t+1}^{\rightarrow}$]] of a value $v_{t+1}^{\rightarrow}$ of the weight vector $v^{\rightarrow}$ obtained as a result of t+1 updates.

The model parameter updating means[[unit]] 230 calculates, from a j-th element [[$w_{j,t}$]] of the share [[$w_t^{\rightarrow}$]] and [[$v_{j,t+1}$]] by [[$w_{j,t+1}$]]=[[$w_{j,t}$]]−[[$v_{j,t+1}$]], a j-th element [[$w_{j,t+1}$]] of a share [[$w_{t+1}^{\rightarrow}$]] of a value $w_{t+1}^{\rightarrow}$ of the model parameter $w^{\rightarrow}$ obtained as a result of t+1 updates.

The model parameter updating means 230 calculates [[$v_{j,t+1}$]]=rshift([[$v_{j,t+1}$]], b_$\alpha$) from [[$v_{j,t+1}$]]. That is, the model parameter updating means 230 uses, as a new share [[$v_{j,t+1}$]], a share [[$v_{j,t+1}$]] of a value obtained by shifting $v_{j,t+1}$ to the right by b_$\alpha$.

The processing which is performed by the convergence condition judging means[[unit]] 240 is the same as that described above.

As described above, by using the optimization technique based on the NAG method, it is possible to increase learning efficiency.

APPENDIX

Each apparatus according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer, for example.

The external storage device of the hardware entity has stored therein programs necessary for embodying the aforementioned functions and data necessary in the processing of the programs (in addition to the external storage device, the programs may be prestored in ROM as a storage device exclusively for reading out, for example). Also, data or the like resulting from the processing of these programs are stored in the RAM and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined functions (the components represented above as units, means, or the like).

The present invention is not limited to the above embodiments, but modifications may be made within the scope of the present invention. Also, the processes described in the embodiments may be executed not only in a chronological sequence in accordance with the order of their description but may be executed in parallel or separately according to the processing capability of the apparatus executing the processing or any necessity.

As already mentioned, when the processing functions of the hardware entities described in the embodiments (the apparatuses of the present invention) are to be embodied with a computer, the processing details of the functions to be provided by the hardware entities are described by a program. By the program then being executed on the computer, the processing functions of the hardware entity are embodied on the computer.

The program describing the processing details can be recorded on a computer-readable recording medium. The computer-readable recording medium may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer then reads the program stored in the storage device thereof and executes the processing in accordance with the read program. Also, as another form of execution of this program, the computer may read the program directly from the portable recording medium and execute the processing in accordance with the program and, furthermore, every time the program is transferred to the computer from the server computer, the computer may sequentially execute the processing in accordance with the received program. Also, a configuration may be adopted in which the transfer of a program to the computer from the server computer is not performed and the above-described processing is executed by so-called application service provider (ASP)-type service by which the processing functions are implemented only by an instruction for execution thereof and result acquisition. Note that a program in this form shall encompass information that is used in processing by an electronic computer and acts like a program (such as data that is not a direct command to a computer but has properties prescribing computer processing).

Further, although the hardware entity was described as being configured via execution of a predetermined program on a computer in this form, at least some of these processing details may instead be embodied with hardware.

What is claimed is:

1. A secure logistic regression calculation system in which $\eta$ is a real number that satisfies $0<\eta<1$, and Sigmoid $([[x]])$ is a function that calculates, from a share $[[\vec{x}]]$ of an input vector $\vec{x}$, a share $[[\vec{y}]]$ of a value $\vec{y}$ of a sigmoid function for the input vector $\vec{x}$ using a secure sigmoid function calculation system in which $map_\sigma$ is a secure batch mapping predefined by parameters $(a_0, \ldots, a_{k-1})$ representing a domain of definition of a sigmoid function $\sigma(x)$ and parameters $(\sigma(a_0), \ldots, \sigma(a_{k-1}))$ representing a range of the sigmoid function $\sigma(x)$ (where k is an integer greater than or equal to 1 and $a_0, \ldots, a_{k-1}$ are real numbers that satisfy $a_0 < \ldots < a_{k-1}$), and the secure sigmoid function calculation system is a secure sigmoid function calculation system with three or more secure sigmoid function calculation apparatuses performing cooperative computations that are connected to each other by a data network and calculates, from a share $[[\vec{x}]]=([[x_0]], \ldots, [[x_{m-1}]])$ of an input vector $\vec{x}=(x_0, \ldots, x_{m-1})$, a share $[[\vec{y}]]=([[y_0]], \ldots, [[y_{m-1}]])$ of a value $\vec{y}=(y_0, \ldots, y_{m-1})$ of a sigmoid function for the input vector $\vec{x}$, the secure sigmoid function calculation system comprising:

the three or more secure sigmoid function calculation apparatuses each including circuitry and a memory,

[[a]] secure batch mapping calculation circuitry that calculates $map_\sigma([[\vec{x}]])=([[\sigma(a_{f(0)})]], \ldots, [[\sigma(a_{f(m-1)})]])$ (where f(i) ($0 \le i \le m-1$) is j that makes $a_j \le x_i < a_{j+1}$ hold true) from the share $[[\vec{x}]]$ and calculates the share $[[\vec{y}]]$ by $([[y_0]], \ldots, [[y_{m-1}]])=([[\sigma(a_{f(0)})]], \ldots, [[\sigma(a_{f(m-1)})]])$ by referring to the $map_\sigma$ which is predefined, wherein m is an integer greater than or equal to 1, when an arbitrary value, which is an object on which secure computation is to be performed, is p and b_p [bit] is a predetermined positive integer, it means that a share of p is actually a share $[[p \times 2^{b\_p}]]$ of a fixed-point number, when an arbitrary vector, which is an object on which secure computation is to be performed, is $\vec{q}$, an element of $\vec{q}$ is $q_i$, and b_q [bit] is a predetermined positive integer, it means that a share $[[\vec{q}]]$ of $\vec{q}$ is actually made up of a share $[[q_i \times 2^{b\_q}]]$ of a fixed-point number, b_w, b_x, b_y, b_$\eta$, b_m, H, and b_tmp are predetermined positive integers, rshift(a, b) means shifting a value a to the right by b [bit] by performing an arithmetic right shift, and the secure logistic regression calculation system is a secure logistic regression calculation system with three or more secure logistic regression calculation apparatuses and calculates a share $[[\vec{w}]]$ of a model parameter $\vec{w}$ of a logistic regression model from a share $[[\vec{x_i}]]$ ($0 \le i \le m-1$) of data $\vec{x_i}$ on an explanatory variable and a share $[[y_i]]$ ($0 \le i \le m-1$) of data $y_i$ on a response variable, the secure logistic regression calculation system comprising:

initializing circuitry that sets a share $[[\vec{w_0}]]$ of an initial value $\vec{w_0}$ of the model parameter $\vec{w}$;

[[an]] error calculation circuitry that calculates, for $i=0, \ldots, m-1$, $[[b_i]]$ by $[[b_i]]=\text{hpsum}([[\vec{w_t}]], [[(1, \vec{x_i})]])$ from a share $[[\vec{w_t}]]$ of a value $\vec{w_t}$ of the model parameter $\vec{w}$ obtained as a result of t updates and the share $[[\vec{x_i}]]$, calculates $([[c_0]], \ldots, [[c_{m-1}]])$ by $([[c_0]], \ldots, [[c_{m-1}]])=\text{Sigmoid}(([[b_0]], \ldots, [[b_{m-1}]]))$ from the $[[b_i]]$ ($0 \le i \le m-1$), and calculates, for $i=0, \ldots, m-1$, an error $[[d_i]]$ by $[[d_i]]=[[c_i]]-[[y_i]]$ from the share $[[y_i]]$ and an i-th element $[[c_i]]$ of the $([[c_0]], \ldots, [[c_{m-1}]])$; and

[[a]] model parameter update circuitry that calculates, for $j=0, \ldots, n$, $[[e]]$ by $[[e]]=\Sigma_{i=0}^{m-1}[[d_i]][[x_{i,j}]]$ from the error $[[d_i]]$ ($0 \le i \le m-1$) and a j-th element $[[x_{i,j}]]$ ($0 \le i \le m-1$) of the share $[[\vec{x_i}]]$, calculates $[[\text{eta\_grad}]]$ by $[[\text{eta\_grad}]]=\eta[[e]]$ from the $\eta$ and the $[[e]]$, calculates $[[\text{eta\_grad\_shift}]]$ by $[[\text{eta\_grad\_shift}]]=\text{rshift}([[\text{eta\_grad}]], b\_y+b\_x+b\_\eta-b\_tmp)$ from the $[[\text{eta\_grad}]]$, calculates $[[\text{eta\_grad\_ave}]]$ by $[[\text{eta\_grad\_ave}]]=(1/m)[[\text{eta\_grad\_shift}]]$ from the $[[\text{eta\_}$ grad_shift]], calculates [[eta_grad_ave_shift]] by [[eta_grad_ave_shift]]=rshift ([[eta_grad_ave]], b_tmp+b_m+H−b_w) from the [[eta_grad_ave]], and calculates, from a j-th element [[$w_{j,t}$]] of the share [[$w_t^\rightarrow$]] and the [[eta_grad_ave_shift]] by [[$w_{j,t+1}$]]= [[$w_{j,t}$]]−[[eta_grad_ave_shift]], a j-th element [[$w_{j,t+1}$]] of a share [[$w_{t+1}^\rightarrow$]] of a value $w_{t+1}^\rightarrow$ of the model parameter $w^\rightarrow$ obtained as a result of t+1 updates, wherein the calculations of the secure logistic regression calculation system are performed securely without leaking any information outside.

2. A secure logistic regression calculation system in which η is a real number that satisfies 0<η<1, and Sigmoid ([[x]]) is a function that calculates, from a share [[$x^\rightarrow$]] of an input vector $x^\rightarrow$, a share [[$y^\rightarrow$]] of a value $y^\rightarrow$ of a sigmoid function for the input vector $x^\rightarrow$ using a secure sigmoid function calculation system in which map$_\sigma$ is a secure batch mapping predefined by parameters ($a_0, \ldots, a_{k-1}$) representing a domain of definition of a sigmoid function σ(x) and parameters (σ($a_0$), . . . , σ($a_{k-1}$)) representing a range of the sigmoid function σ(x) (where k is an integer greater than or equal to 1 and $a_0, \ldots, a_{k-1}$ are real numbers that satisfy $a_0 < \ldots < a_{k-1}$), and the secure sigmoid function calculation system is a secure sigmoid function calculation system that is configured with three or more secure sigmoid function calculation apparatuses performing cooperative computations that are connected to each other by a data network and calculates, from a share [[$x^\rightarrow$]]=([[$x_0$]], . . . , [[$x_{m-1}$]]) of an input vector $x^\rightarrow=(x_0, \ldots, x_{m-1})$, a share [[$y^\rightarrow$]]=([[$y_0$]], . . . , [[$y_{m-1}$]]) of a value $y^\rightarrow=(y_0, \ldots, y_{m-1})$ of a sigmoid function for the input vector $x^\rightarrow$, the secure sigmoid function calculation system comprising:

the three or more secure sigmoid function calculation apparatuses each including circuitry and a memory,

[[a]] secure batch mapping calculation circuitry that calculates map$_\sigma$([[$x^\rightarrow$]])=([[σ($a_{f(0)}$)]], . . . , [[σ($a_{f(m-1)}$)]]) (where f(i) (0≤i≤m−1) is j that makes $a_j \leq x_i < a_{j+1}$ hold true) from the share [[$x^\rightarrow$]] and calculates the share [[$y^\rightarrow$]] by ([[$y_0$]], . . . , [[$y_{m-1}$]])=([[σ($a_{f(0)}$)]], . . . , [[σ($a_{f(m-1)}$)]]) by referring to the maps which is predefined, wherein m is an integer greater than or equal to 1, when an arbitrary value, which is an object on which secure computation is to be performed, is p and b_p [bit] is a predetermined positive integer, it means that a share [[p]] of p is actually a share [[p×$2^{b-p}$]] of a fixed-point number, when an arbitrary vector, which is an object on which secure computation is to be performed, is $q^\rightarrow$, an element of $q^\rightarrow$ is $q_i$, and b_q [bit] is a predetermined positive integer, it means that a share [[$q^\rightarrow$]] of $q^\rightarrow$ is actually made up of a share [[$q_i \times 2^{b-q}$]] of a fixed-point number, b_w, b_x, b_y, and b_η are predetermined positive integers, rshift(a, b) means shifting a value a to the right by b [bit] by performing an arithmetic right shift, floor is a function representing rounding down and X=−(floor ($\log_2$ (η/m))), and the secure logistic regression calculation system is a secure logistic regression calculation system with three or more secure logistic regression calculation apparatuses and calculates a share [[$w^\rightarrow$]] of a model parameter $w^\rightarrow$ of a logistic regression model from a share [[$x_i^\rightarrow$]] (0≤i≤m−1) of data $x_i^\rightarrow$ on an explanatory variable and a share [[$y_i$]] (0≤i≤m−1) of data $y_i$ on a response variable, the secure logistic regression calculation system comprising:

initializing circuitry that sets a share [[$w_0^\rightarrow$]] of an initial value $w_0^\rightarrow$ of the model parameter $w^\rightarrow$;

[[an]] error calculation circuitry that calculates, for i=0, . . . , m−1, [[$b_i$]] by [[$b_i$]]=hpsum ([[$w_t^\rightarrow$]], [[(1, $x_i^\rightarrow$)]]) from a share [[$w_t^\rightarrow$]] of a value $w_i^\rightarrow$ of the model parameter $w^\rightarrow$ obtained as a result of t updates and the share [[$x_i^\rightarrow$]], calculates ([[$c_0$]], . . . , [[$c_{m-1}$]]) by ([[$c_0$]], . . . , [[$c_{m-1}$]])=Sigmoid (([[$b_0$]], . . . , [[$b_{m-1}$]])) from the [[$b_i$]] (0≤i≤m−1), and calculates, for i=0, . . . , m−1, an error [[$d_i$]] by [[$d_i$]]=[[$c_i$]]−[[$y_i$]] from the share [[$y_i$]] and an i-th element [[$c_i$]] of the ([[$c_0$]], . . . , [[$c_{m-1}$]]); and

[[a]] model parameter update circuitry that calculates, for j=0, . . . , n, [[e]] by [[e]]=$\Sigma_{i=0}^{m-1}$[[$d_i$]][[$x_{i,j}$]] from the error [[$d_i$]] (0≤i≤m−1) and a j-th element [[$x_{i,j}$]] (0≤i≤m−1) of the share [[$x_i^\rightarrow$]], calculates [[eta_grad_ave]] by [[eta_grad_ave]]=rshift ([[e]], X+b_y+b_x−b_w) from the [[e]], and calculates, from a j-th element [[$w_{j,t}$]] of the share [[$w_t^\rightarrow$]] and the [[eta_grad_ave]] by [[$w_{j,t+1}$]]=[[$w_{j,t}$]]−[[eta_grad_ave]], a j-th element [[$w_{j,t+1}$]] of a share [[$w_{t+1}^\rightarrow$]] of a value $w_{t+1}^\rightarrow$ of the model parameter $w^\rightarrow$ obtained as a result of t+1 updates, wherein the calculations of the secure logistic regression calculation system are performed securely without leaking any information outside.

3. A secure logistic regression calculation apparatus in which

η is a real number that satisfies 0<η<1, and Sigmoid ([[x]]) is a function that calculates, from a share [[$x^\rightarrow$]] of an input vector $x^\rightarrow$, a share [[$y^\rightarrow$]] of a value $y^\rightarrow$ of a sigmoid function for the input vector $x^\rightarrow$ using a secure sigmoid function calculation apparatus in which map$_\sigma$ is secure batch mapping predefined by parameters ($a_0, \ldots, a_{k-1}$) representing a domain of definition of a sigmoid function σ(x) and parameters (σ($a_0$), . . . , σ($a_{k-1}$)) representing a range of the sigmoid function σ(x) (where k is an integer greater than or equal to 1 and $a_0, \ldots, a_{k-1}$ are real numbers that satisfy $a_0 < \ldots < a_{k-1}$), and the secure sigmoid function calculation apparatus is a secure sigmoid function calculation apparatus in a secure sigmoid function calculation system that is configured with three or more secure sigmoid function calculation apparatuses performing cooperative computations that are connected to each other by a data network and calculates, from a share [[$x^\rightarrow$]]=([[$x_0$]], . . . , [[$x_{m-1}$]]) of an input vector $x^\rightarrow=(x_0, \ldots, x_{m-1})$, a share [[$y^\rightarrow$]]=([[$y_0$]], . . . , [[$y_{m-1}$]]) of a value $y^\rightarrow=(y_0, \ldots, y_{m-1})$ of a sigmoid function for the input vector $x^\rightarrow$, the secure sigmoid function calculation apparatus comprising a memory, and processing circuitry configured to calculate map$_\sigma$([[$x^\rightarrow$]])=([[σ($a_{f(0)}$)]], . . . , [[σ($a_{f(m-1)}$)]]) (where f(i) (0≤i≤m−1) is j that makes $a_j \leq x_i < a_{j+1}$ hold true) from the share [[$x_\rightarrow$]] and calculating the share [[$y^\rightarrow$]] by ([[$y_0$]], . . . , [[$y_{m-1}$]])=([[σ($a_{f(0)}$)]], . . . , [[σ($a_{f(m-1)}$)]]) by referring to the maps which is predefined, wherein m is an integer greater than or equal to 1, when an arbitrary value, which is an object on which secure computation is to be performed, is p and b_p

[bit] is a predetermined positive integer, it means that a share of p is actually a share $[[p \times 2^{b-p}]]$ of a fixed-point number, when an arbitrary vector, which is an object on which secure computation is to be performed, is $\vec{q}$, an element of $\vec{q}$ is $q_i$, and b_q [bit] is a predetermined positive integer, it means that a share $[[\vec{q}]]$ of $\vec{q}$ is actually made up of a share $[[q_i \times 2^{b-q}]]$ of a fixed-point number, b_w, b_x, b_y, b_η, b_m, H, and b_tmp are predetermined positive integers, rshift(a, b) means shifting a value a to the right by b [bit] by performing an arithmetic right shift, and the secure logistic regression calculation apparatus is a secure logistic regression calculation apparatus in a secure logistic regression calculation system with three or more secure logistic regression calculation apparatuses and calculates a share $[[\vec{w}]]$ of a model parameter $\vec{w}$ of a logistic regression model from a share $[[\vec{x_i}]]$ ($0 \le i \le m-1$) of data $\vec{x_i}$ on an explanatory variable and a share $[[y_i]]$ ($0 \le i \le m-1$) of data $y_i$ on a response variable, the secure logistic regression calculation apparatus comprising processing circuitry configured to set a share $[[\vec{w_0}]]$ of an initial value $\vec{w_0}$ of the model parameter $\vec{w}$;

calculate, for $i=0, \ldots, m-1$, $[[b_i]]$ by $[[b_i]]=$hpsum $([[\vec{w_t}]], [[(1, \vec{x_i})]])$ from a share $[[\vec{w_t}]]$ of a value $\vec{w_t}$ of the model parameter $\vec{w}$ obtained as a result of t updates and the share $[[\vec{x_i}]]$, calculates $([[c_0]], \ldots, [[c_{m-1}]])$ by $([[c_0]], \ldots, [[c_{m-1}]])=$Sigmoid $(([[b_0]], \ldots, [[b_{m-1}]]))$ from the $[[b_i]]$ ($0 \le i \le m-1$), and calculates, for $i=0, \ldots, m-1$, an error $[[d_i]]$ by $[[d_i]]=[[c_i]]-[[y_i]]$ from the share $[[y_i]]$ and an i-th element $[[c_i]]$ of the $([[c_0]], \ldots, [[c_{m-1}]])$; and calculate, for $j=0, \ldots, n$, $[[e]]$ by $[[e]]=\Sigma_{i=0}^{m-1}[[d_i]][[x_{i,j}]]$ from the error $[[d_i]]$ ($0 \le i \le m-1$) and a j-th element $[[x_{i,j}]]$ ($0 \le i \le m-1$) of the share $[[\vec{x_i}]]$, calculates $[[\text{eta\_grad}]]$ by $[[\text{eta\_grad}]]=\eta[[e]]$ from the $\eta$ and the $[[e]]$, calculates $[[\text{eta\_grad\_shift}]]$ by $[[\text{eta\_grad\_shift}]]=$rshift$([[\text{eta\_grad}]], \text{b\_y+b\_x+b\_\eta-b\_tmp})$ from the $[[\text{eta\_grad}]]$, calculates $[[\text{eta\_grad\_ave}]]$ by $[[\text{eta\_grad\_ave}]]=(1/m)[[\text{eta\_grad\_shift}]]$ from the $[[\text{eta\_grad\_shift}]]$, calculates $[[\text{eta\_grad\_ave\_shift}]]$ by $[[\text{eta\_grad\_ave\_shift}]]=$rshift$([[\text{eta\_grad\_ave}]], \text{b\_tmp+b\_m+H-b\_w})$ from the $[[\text{eta\_grad\_ave}]]$, and calculates, from a j-th element $[[w_{j,t}]]$ of the share $[[\vec{w_t}]]$ and the $[[\text{eta\_grad\_ave\_shift}]]$ by $[[w_{j,t+1}]]=[[w_{j,t}]]-[[\text{eta\_grad\_ave\_shift}]]$, a j-th element $[[w_{j,t+1}]]$ of a share $[[\vec{w_{t+1}}]]$ of a value $\vec{w_{t+1}}$ of the model parameter $\vec{w}$ obtained as a result of t+1 updates, wherein the calculations of the secure logistic regression calculation apparatus are performed securely without leaking any information outside.

4. A secure logistic regression calculation apparatus in which

η is a real number that satisfies $0<\Theta<1$, and Sigmoid $([[x]])$ is a function that calculates, from a share $[[\vec{x}]]$ of an input vector $\vec{x}$, a share $[[\vec{y}]]$ of a value $\vec{y}$ of a sigmoid function for the input vector $\vec{x}$ using a secure sigmoid function calculation apparatus in which $\text{map}_\sigma$ is secure batch mapping predefined by parameters $(a_0, \ldots, a_{k-1})$ representing a domain of definition of a sigmoid function $\sigma(x)$ and parameters $(\sigma(a_0), \ldots, \sigma(a_{k-1}))$ representing a range of the sigmoid function $\sigma(x)$ (where k is an integer greater than or equal to 1 and $a_0, \ldots, a_{k-1}$ are real numbers that satisfy $a_0< \ldots <a_{k-1}$), and the secure sigmoid function calculation apparatus is a secure sigmoid function calculation apparatus in a secure sigmoid function calculation system with three or more secure sigmoid function calculation apparatuses performing cooperative computations that are connected to each other by a data network and calculates, from a share $[[\vec{x}]]=([[x_0]], \ldots, [[x_{m-1}]])$ of an input vector $\vec{x}=(x_0, \ldots, x_{m-1})$, a share $[[\vec{y}]]=([[y_0]], \ldots, [[y_{m-1}]])$ of a value $\vec{y}=(y_0, \ldots, y_{m-1})$ of a sigmoid function for the input vector $\vec{x}$, the secure sigmoid function calculation apparatus comprising a memory, and processing circuitry configured to calculate $\text{map}_\sigma([[\vec{x}]])=([[\sigma(a_{f(0)})]], \ldots, [[\sigma(a_{f(m-1)})]])$ (where f(i) ($0 \le i \le m-1$) is j that makes $a_j \le x_i < a_{j+1}$ hold true) from the share $[[\vec{x}]]$ and calculating the share $[[\vec{y}]]$ by $([[y_0]], \ldots, [[y_{m-1}]])=([[\sigma(a_{f(0)})]], \ldots, [[\sigma(a_{f(m-1)})]])$ by referring to the maps which is predefined, wherein m is an integer greater than or equal to 1, when an arbitrary value, which is an object on which secure computation is to be performed, is p and b_p [bit] is a predetermined positive integer, it means that a share $[[p]]$ of p is actually a share $[[p \times 2^{b-p}]]$ of a fixed-point number, when an arbitrary vector, which is an object on which secure computation is to be performed, is $\vec{q}$, an element of $\vec{q}$ is $q_i$, and b_q [bit] is a predetermined positive integer, it means that a share $[[\vec{q}]]$ of $\vec{q}$ is actually made up of a share $[[q_i \times 2^{b-q}]]$ of a fixed-point number, b_w, b_x, b_y, and b_η are predetermined positive integers, rshift(a, b) means shifting a value a to the right by b [bit] by performing an arithmetic right shift, floor is a function representing rounding down and $X=-(\text{floor}(\log_2(\eta/m)))$, and the secure logistic regression calculation apparatus is a secure logistic regression calculation apparatus in a secure logistic regression calculation system with three or more secure logistic regression calculation apparatuses and calculates a share $[[\vec{w}]]$ of a model parameter $\vec{w}$ of a logistic regression model from a share $[[\vec{x_i}]]$ ($0 \le i \le m-1$) of data $\vec{x_i}$ on an explanatory variable and a share $[[y_i]]$ ($0 \le i \le m-1$) of data y: on a response variable, the secure logistic regression calculation apparatus comprising processing circuitry configured to set a share $[[\vec{w_0}]]$ of an initial value $\vec{w_0}$ of the model parameter $\vec{w}$;

calculate, for $i=0, \ldots, m-1$, $[[b_i]]$ by $[[b_i]]=$hpsum $([[\vec{w_t}]], [[(1, \vec{x_i})]])$ from a share $[[\vec{w_t}]]$ of a value $\vec{w_t}$ of the model parameter $\vec{w}$ obtained as a result of t updates and the share $[[\vec{x_i}]]$, calculates $([[c_0]], \ldots, [[c_{m-1}]])$ by $([[c_0]], \ldots, [[c_{m-1}]])=$Sigmoid $(([[b_0]], \ldots, [[b_{m-1}]]))$ from the $[[b_i]]$ ($0 \le i \le m-1$), and calculates, for $i=0, \ldots, m-1$, an error $[[d_i]]$ by $[[d_i]]=[[c_i]]-[[y_i]]$ from the share $[[y_i]]$ and an i-th element $[[c_i]]$ of the $([[c_0]], \ldots, [[c_{m-1}]])$; and calculate, for $j=0, \ldots, n$, $[[e]]$ by $[[e]]=\Sigma_{i=0}^{m-1}[[d_i]][[x_{i,j}]]$ from the error $[[d_i]]$ ($0 \le i \le m-1$) and a j-th element $[[x_{i,j}]]$ ($0 \le i \le m-1$) of the share $[[\vec{x_i}]]$, calculates

[[eta_grad_ave]] by [[eta_grad_ave]]=rshift([[e]], X+b_y+b_x−b_w) from the [[e]], and calculates, from a j-th element [[$w_{j,t}$]] of the share [[$w_t^\rightarrow$]] and the [[eta_grad_ave]] by [[$w_{j,\ t+1}$]]=[[$w_{j,t}$]]-[[eta_grad_ave]], a j-th element [[$w_{j,\ t+1}$]] of a share [[$w_{t+1}^\rightarrow$]] of a value $w_{t+1}^\rightarrow$ of the model parameter $w^\rightarrow$ obtained as a result of t+1 updates, wherein the calculations of the secure logistic regression calculation apparatus are performed securely without leaking any information outside.

5. A secure logistic regression calculation method in which η is a real number that satisfies 0<η<1, and Sigmoid ( ) is a function that calculates, from a share [[$x^\rightarrow$]] of an input vector $x^\rightarrow$, a share [[$y^\rightarrow$]] of a value $y^\rightarrow$ of a sigmoid function for the input vector $x^\rightarrow$ using a secure sigmoid function calculation method in which map$_\sigma$ is secure batch mapping predefined by parameters ($a_0, \ldots, a_{k-1}$) representing a domain of definition of a sigmoid function σ(x) and parameters (σ($a_0$), ..., σ($a_{k-1}$)) representing a range of the sigmoid function σ(x) (where k is an integer greater than or equal to 1 and $a_0, \ldots, a_{k-1}$ are real numbers that satisfy $a_0 < \ldots < a_{k-1}$), and the secure sigmoid function calculation method is a secure sigmoid function calculation method by which a secure sigmoid function calculation system with three or more secure sigmoid function calculation apparatuses performing cooperative computations that are connected to each other by a data network calculates, from a share [[$x^\rightarrow$]]=([[$x_0$]], ..., [[$x_{m-1}$]]) of an input vector $x^\rightarrow$=($x_0, \ldots, x_{m-1}$), a share [[$y^\rightarrow$]]=([[$y_0$]], ..., [[$y_{m-1}$]]) of a value $y^\rightarrow$=($y_0, \ldots, y_{m-1}$) of a sigmoid function for the input vector $x^\rightarrow$, the secure sigmoid function calculation method comprising:

a secure batch mapping calculating step in which the secure sigmoid function calculation system calculates map$_\sigma$([[$x^\rightarrow$]])=([[σ($a_{f(0)}$)]], ..., [[σ($a_{f(m-1)}$)]]) (where f(i) (0≤i≤m−1) is j that makes $a_j \leq x_i < a_{j+1}$ hold true) from the share [[$x^\rightarrow$]] and calculates the share [[y]] by ([[$y_0$]], ... [[$y_{m-1}$]])=([[σ($a_{f(0)}$)]], ..., [[σ($a_{f(m-1)}$)]]) by referring to the maps which is predefined, wherein m is an integer greater than or equal to 1, when an arbitrary value, which is an object on which secure computation is to be performed, is p and b_p [bit] is a predetermined positive integer, it means that a share [[p]] of p is actually a share [[$p \times 2^{b\_p}$]] of a fixed-point number, when an arbitrary vector, which is an object on which secure computation is to be performed, is $q^\rightarrow$, an element of $q^\rightarrow$ is $q_i$, and b_q [bit] is a predetermined positive integer, it means that a share [[$q^\rightarrow$]] of $q^\rightarrow$ is actually made up of a share [[$q_i \times 2^{b\_q}$]] of a fixed-point number, b_w, b_x, b_y, b_η, b_m, H, and b_tmp are predetermined positive integers, rshift(a, b) means shifting a value a to the right by b [bit] by performing an arithmetic right shift, and the secure logistic regression calculation method is a secure logistic regression calculation method by which a secure logistic regression calculation system with three or more secure logistic regression calculation apparatuses calculates a share [[$w^\rightarrow$]] of a model parameter $w^\rightarrow$ of a logistic regression model from a share [[$x_i^\rightarrow$]] (0≤i≤m−1) of data $x_i^\rightarrow$ on an explanatory variable and a share [[$y_i$]] (0≤i≤m−1) of data $y_i$ on a response variable, the secure logistic regression calculation method comprising:

an initializing step in which the secure logistic regression calculation system sets a share [[$w_0^\rightarrow$]] of an initial value $w_0^\rightarrow$ of the model parameter $w^\rightarrow$;

an error calculating step in which, for i=0, ..., m−1, the secure logistic regression calculation system calculates [[$b_i$]] by [[$b_i$]]=hpsum([[$w_t^\rightarrow$]], [[(1, $x_i^\rightarrow$)]]) from a share [[$w_t^\rightarrow$]] of a value $w_t^\rightarrow$ of the model parameter $w^\rightarrow$ obtained as a result of t updates and the share [[$x_i^\rightarrow$]], calculates ([[$c_0$]], ..., [[$c_{m-1}$]]) by ([[$c_0$]], ..., [[$c_{m-1}$]])=Sigmoid (([[$b_0$]], ..., [[$b_{m-1}$]])) from the [[$b_i$]] (0≤i≤m−1), and, for i=0, ..., m−1, calculates an error [[$d_i$]] by [[$d_i$]]=[[$c_i$]]-[[$y_i$]] from the share [[$y_i$]] and an i-th element [[$c_i$]] of the ([[$c_0$]], ..., [[$c_{m-1}$]]); and a model parameter updating step in which, for j=0, ..., n, the secure logistic regression calculation system calculates [[e]] by [[e]]=$\Sigma_{i=0}^{m-1}$[[$d_i$]][[$x_{i,j}$]] from the error [[$d_i$]] (0≤i≤m−1) and a j-th element [[$x_{i,j}$]] (0≤i≤m−1) of the share [[$x_i^\rightarrow$]], calculates [[eta_grad]] by [[eta_grad]]=η[[e]] from the η and the [[e]], calculates [[eta_grad_shift]] by [[eta_grad_shift]]=rshift([[eta_grad]], b_y+b_x+b_η−b_tmp) from the [[eta_grad]], calculates [[eta_grad_ave]] by [[eta_grad_ave]]=(1/m)[[eta_grad_shift]] from the [[eta_grad_shift]], calculates [[eta_grad_ave_shift]] by [[eta_grad_ave_shift]]=rshift([[eta_grad_ave]], b_tmp+b_m+H−b_w) from the [[eta_grad_ave]], and calculates, from a j-th element [[$w_{j,t}$]] of the share [[$w_t^\rightarrow$]] and the [[eta_grad_ave_shift]] by [[$w_{j,t+1}$]]=[[$w_{j,t}$]]-[[eta_grad_ave_shift]], a j-th element [[$w_{j,\ t+1}$]] of a share [[$w_{t+1}^\rightarrow$]] of a value $w_{t+1}^\rightarrow$ of the model parameter $w^\rightarrow$ obtained as a result of t+1 updates, wherein the calculations of the secure logistic regression calculation method are performed securely without leaking any information outside.

6. A secure logistic regression calculation method in which η is a real number that satisfies 0<η<1, and Sigmoid ([[x]]) is a function that calculates, from a share [[$x^\rightarrow$]] of an input vector $x^\rightarrow$, a share [[$y^\rightarrow$]] of a value $y^\rightarrow$ of a sigmoid function for the input vector $x^\rightarrow$ using a secure sigmoid function calculation method in which map$_\sigma$ is secure batch mapping predefined by parameters ($a_0, \ldots, a_{k-1}$) representing a domain of definition of a sigmoid function σ(x) and parameters (σ($a_0$), ..., σ($a_{k-1}$)) representing a range of the sigmoid function σ(x) (where k is an integer greater than or equal to 1 and $a_0, \ldots, a_{k-1}$ are real numbers that satisfy $a_0 < \ldots < a_{k-1}$), and the secure sigmoid function calculation method is a secure sigmoid function calculation method by which a secure sigmoid function calculation system with three or more secure sigmoid function calculation apparatuses performing cooperative computations that are connected to each other by a data network calculates, from a share [[$x^\rightarrow$]]=([[$x_0$]], ..., [[$x_{m-1}$]]) of an input vector $x^\rightarrow$=($x_0, \ldots, x_{m-1}$), a share [[$y^\rightarrow$]]=([[$y_0$]], ..., [[$y_{m-1}$]]) of a value $y^\rightarrow$=($y_0, \ldots, y_{m-1}$) of a sigmoid function for the input vector $x^\rightarrow$;

the secure sigmoid function calculation method comprising:

a secure batch mapping calculating step in which the secure sigmoid function calculation system calculates map$_\sigma$([[$x^\rightarrow$]])=([[σ($a_{f(0)}$)]], ..., [[σ($a_{f(m-1)}$)]]) (where f(i) (0≤i≤m−1) is j that makes $a_j \leq x_i < a_{j+1}$ hold true) from the share [[$x^\rightarrow$]] and calculates the share [[$y^\rightarrow$]] by $([[y_0]], \ldots, [[y_{m-1}]]) = ([[\sigma(a_{f(0)})]], \ldots, [[\sigma(a_{f(m-1)})]])$ by referring to the mapo which is predefined, wherein m is an integer greater than or equal to 1, when an arbitrary value, which is an object on which secure computation is to be performed, is p and b_p [bit] is a predetermined positive integer, it means that a share [[p]] of p is actually a share $[[p \times 2^{b\_p}]]$ of a fixed-point number, when an arbitrary vector, which is an object on which secure computation is to be performed, is $\vec{q}$, an element of $\vec{q}$ is $q_i$, and b_q [bit] is a predetermined positive integer, it means that a share $[[\vec{q}]]$ of $\vec{q}$ is actually made up of a share $[[q_i \times 2^{b\_q}]]$ of a fixed-point number, b_w, b_x, b_y, and b_η are predetermined positive integers, rshift(a, b) means shifting a value a to the right by b [bit] by performing an arithmetic right shift, floor is a function representing rounding down and X=−(floor ($\log_2(\eta/m)$)), and the secure logistic regression calculation method is a secure logistic regression calculation method by which a secure logistic regression calculation system with three or more secure logistic regression calculation apparatuses calculates a share $[[\vec{w}]]$ of a model parameter $\vec{w}$ of a logistic regression model from a share $[[\vec{x_i}]]$ (0≤i≤m−1) of data $\vec{x_i}$ on an explanatory variable and a share $[[y_i]]$ (0≤i≤m−1) of data $y_i$ on a response variable, the secure logistic regression calculation method comprising:

an initializing step in which the secure logistic regression calculation system sets a share $[[\vec{w_0}]]$ of an initial value $\vec{w_0}$ of the model parameter $\vec{w}$;

an error calculating step in which, for i=0, ..., m−1, the secure logistic regression calculation system calculates $[[b_i]]$ by $[[b_i]]$=hpsum($[[\vec{w_t}]]$, $[[(1, \vec{x_i})]]$) from a share $[[\vec{w_t}]]$ of a value $\vec{w_t}$ of the model parameter $\vec{w}$ obtained as a result of t updates and the share $[[\vec{x_i}]]$, calculates $([[c_0]], \ldots, [[c_{m-1}]])$ by $([[c_0]], \ldots, [[c_{m-1}]])$=Sigmoid($([[b_0]] \ldots, [[b_{m-1}]])$) from the $[[b_i]]$ (0≤i≤m−1), and, for i=0, ..., m−1, calculates an error $[[d_i]]$ by $[[d_i]]=[[c_i]]-[[y_i]]$ from the share $[[y_i]]$ and an i-th element $[[c_i]]$ of the $([[c_0]], \ldots, [[c_{m-1}]])$; and a model parameter updating step in which, for j=0, ..., n, the secure logistic regression calculation system calculates $[[e]]$ by $[[e]]=\Sigma_{i=0}^{m-1}[[d_i]][[x_{i,j}]]$ from the error $[[d_i]]$ (0≤i≤m−1) and a j-th element $[[x_{i,j}]]$ (0≤i≤m−1) of the share $[[\vec{x_i}]]$, calculates $[[\text{eta\_grad\_ave}]]$ by $[[\text{eta\_grad\_ave}]]$=rshift($[[e]]$, X+b_y+b_x−b_w) from the $[[e]]$, and calculates, from a j-th element, $[[w_{j,t}]]$ of the share $[[\vec{w_t}]]$ and the $[[\text{eta\_grad\_ave}]]$ by $[[w_{j,t+1}]]=[[w_{j,t}]]-[[\text{eta\_grad\_ave}]]$, a j-th element $[[w_{j,t+1}]]$ of a share $[[\vec{w_{t+1}}]]$ of a value $\vec{w_{t+1}}$ of the model parameter $\vec{w}$ obtained as a result of t+1 updates, wherein the calculations of the secure logistic regression calculation method are performed securely without leaking any information outside.

\* \* \* \* \*